US012106610B2

United States Patent
Hirano et al.

(10) Patent No.: US 12,106,610 B2
(45) Date of Patent: Oct. 1, 2024

(54) VEHICLE LOG TRANSMISSION DEVICE, VEHICLE LOG COLLECTION SYSTEM, VEHICLE LOG TRANSMISSION METHOD, AND SAVE PRIORITY LEVEL CHANGING DEVICE

(71) Applicant: Panasonic Intellectual Property Corporation of America, Torrance, CA (US)

(72) Inventors: Ryo Hirano, Osaka (JP); Takeshi Kishikawa, Osaka (JP); Yoshihiro Ujiie, Osaka (JP); Tomoyuki Haga, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 234 days.

(21) Appl. No.: 17/728,085

(22) Filed: Apr. 25, 2022

(65) Prior Publication Data

US 2022/0254198 A1 Aug. 11, 2022

Related U.S. Application Data

(63) Continuation of application No. PCT/JP2020/047529, filed on Dec. 18, 2020.

(30) Foreign Application Priority Data

Jan. 14, 2020 (WO) ............... PCT/JP2020/000922

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
CPC .... G07C 5/008; G07C 5/0808; G07C 5/0841; G07C 5/085; G07C 5/00; H04L 41/069;
(Continued)

(56) References Cited

U.S. PATENT DOCUMENTS 10,967,862 B2 * 4/2021 Bonk .................. G05D 1/0027
11,217,042 B2 * 1/2022 Kishikawa ............... G08G 1/04
(Continued)

FOREIGN PATENT DOCUMENTS

EP 3859577 8/2021
EP 4024249 A1 * 7/2022 ............. G06F 21/14
(Continued)

OTHER PUBLICATIONS

International Search Report (ISR) from International Searching Authority (Japan Patent Office) in International Pat. Appl. No. PCT/JP2020/047529, dated Mar. 23, 2021, together with an English language translation.
(Continued)

*Primary Examiner* — Nam V Nguyen
(74) *Attorney, Agent, or Firm* — Greenblum & Bernstein, P.L.C.

(57) ABSTRACT

A vehicle log transmission device includes: an anomaly detector that obtains a vehicle log from at least one electronic control unit, detects an anomaly based on log information in the vehicle log, and extracts log information in which the anomaly is detected as an anomaly log; an anomaly notifier that transmits the anomaly log to a server; a change instructor that, based on a vehicle state extracted from the vehicle log, transmits, to the at least one electronic control unit, a change instruction to change a save priority level of the log information included in the vehicle log; and a vehicle log request responder that, when a vehicle log request is received, obtains the vehicle log including log
(Continued)

information saved based on the save priority level changed in response to the change instruction, and transmits the vehicle log obtained to the server.

16 Claims, 15 Drawing Sheets

(58) Field of Classification Search
CPC ... H04L 43/04; H04L 67/06; H04L 12/40143; H04L 67/12; H04L 2012/40215
USPC .......................................................... 340/4.1
See application file for complete search history.

(56) References Cited

U.S. PATENT DOCUMENTS

| | | | |
|---|---|---|---|
| 11,252,180 B2 * | 2/2022 | Galula | B60R 25/10 |
| 11,838,303 B2 * | 12/2023 | Maeda | H04L 63/1425 |
| 11,863,574 B2 * | 1/2024 | Hasegawa | G06F 11/0793 |
| 2015/0358351 A1 | 12/2015 | Otsuka et al. | |
| 2018/0295147 A1 * | 10/2018 | Haga | H04L 67/12 |
| 2019/0182275 A1 * | 6/2019 | Ando | G06F 11/3476 |
| 2019/0217869 A1 | 7/2019 | Takeuchi et al. | |
| 2020/0336495 A1 | 10/2020 | Tada | |
| 2021/0237665 A1 | 8/2021 | Tamura et al. | |
| 2021/0273966 A1 * | 9/2021 | Sasaki | H04L 12/40 |
| 2022/0254198 A1 * | 8/2022 | Hirano | H04L 43/04 |

FOREIGN PATENT DOCUMENTS

| | | |
|---|---|---|
| JP | 2012-221031 | 11/2012 |
| JP | 2014-146868 | 8/2014 |
| JP | 2018-032254 | 3/2018 |
| JP | 2019-125344 | 7/2019 |
| JP | 2019-125867 | 7/2019 |
| WO | 2018/037708 | 3/2018 |
| WO | 2019/093098 | 5/2019 |

OTHER PUBLICATIONS

Extended European Search Report (EESR) from European Patent Office (EPO) in European Patent Appl. No. 20913758.7, dated Jun. 2, 2023.

International Search Report (ISR) from International Searching Authority (Japan Patent Office) in International Pat. Appl. No. PCT/JP2020/047259, dated Mar. 23, 2021, together with an English language translation.

International Search Report (ISR) from International Searching Authority (Japan Patent Office) in International Pat. Appl. No. PCT/JP2020/000922, dated Mar. 24, 2020, together with an English language translation.

* cited by examiner

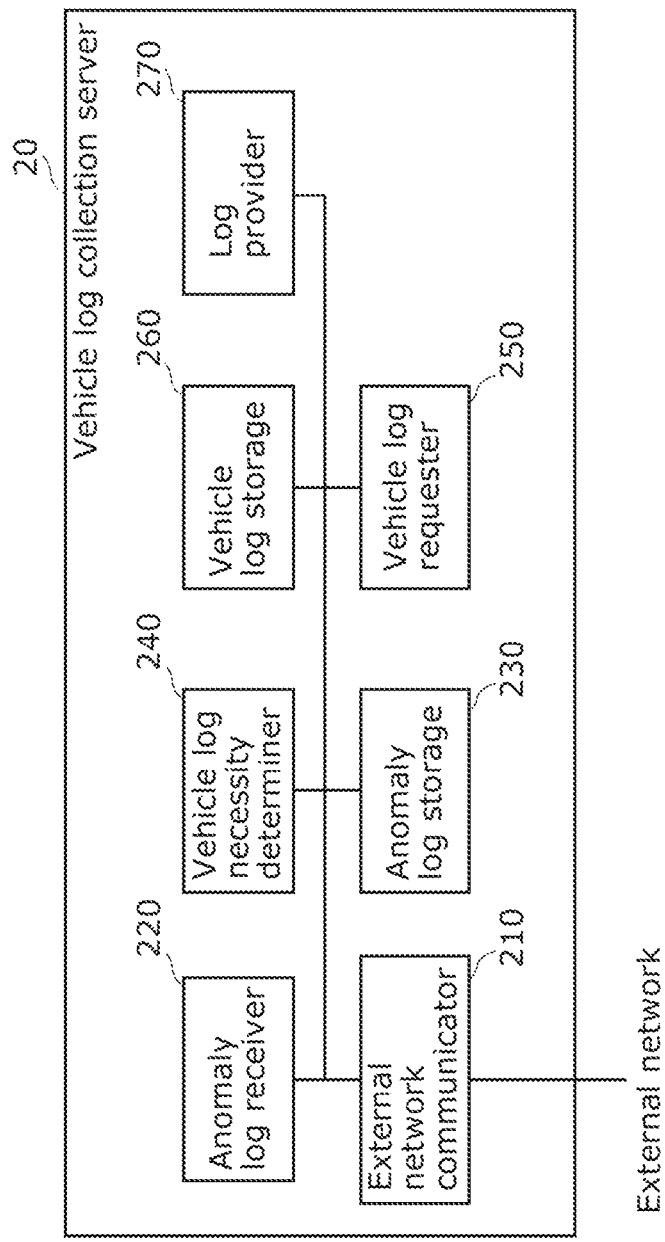

FIG. 6

| Communication ID | Time | Payload data | | | | | | |
|---|---|---|---|---|---|---|---|---|
| | | First byte | Second byte | Third byte | Fourth byte | Fifth byte | Sixth - eighth bytes | |
| M1 | T11 | Counter | Checksum | Internet connection state | Unused | Unused | Unused | |
| M2 | T12 | Counter | Checksum | Travel speed | Travel speed | Emergency brake instruction | Unused | |
| M3 | T13 | Counter | Checksum | Door lock instruction | Unused | Unused | Unused | |
| ... | ... | ... | ... | ... | ... | ... | ... | |
| M4 | T14 | Counter | Travel mode | Vehicle control function | Steering instruction | Steering instruction angle | Unused | |

Travel speed
(2 bytes)
0000 to FFFF

Internet connection state
00: OFF
01: ON

Emergency brake
00: Inactive
01: Active

Steering instruction
(2 bytes)
00: ON
01: OFF

Vehicle control function
00: OFF
01: CC
02: Automatic parking

Door lock state
00: Door lock
01: Door unlock

Travel mode
00: Autonomous driving
01: Manual driving

FIG. 7

| Process ID | Time | ECU name | Data |
|---|---|---|---|
| P1 | T21 | Car navigation ECU | Internet connection failed |
| P2 | T22 | Car navigation ECU | Software update successful |
| P3 | T23 | Brake ECU | Secure boot successful |
| P4 | T24 | Steering ECU | Secure boot successful |
| P5 | T25 | Body ECU | Secure boot successful |
| P6 | T25 | Central ECU | Login from car navigation ECU successful |
| P7 | T26 | Central ECU | Secure boot successful |
| ... | ... | ... | ... |
| P8 | T75 | Central ECU | Communication message transmission successful |

FIG. 8

| Anomaly identifier | Anomaly detection time | Log type | Log ID | Data | | | | | | | |
|---|---|---|---|---|---|---|---|---|---|---|---|
| A1 | T14 | In-vehicle network | M4 | 00 | 01 | 00 | 01 | FF | 00 | 00 | |
| A2 | T26 | ECU | P7 | Secure boot failed | | | | | | | |

FIG. 9

| Vehicle state | Related communication ID | Related process ID | Vehicle state at time of anomaly detection | Save priority level |
|---|---|---|---|---|
| Travel mode | M2, M4 | P3, P4, P7 | Autonomous driving | High |
| | | | Manual driving | Low |
| Travel state | M3 | P5 | Moving | Low |
| | | | Stopped | High |
| Internet connection state | M1 | P1, P2 | ON | High |
| | | | OFF | Low |
| Vehicle control function (Automatic parking) | M2, M4 | P3, P4, P7 | ON | High |
| | | | OFF | Low |
| Vehicle control function (CC) | M2, M4 | P3, P7 | ON | High |
| | | | OFF | Low |
| ... | ... | ... | ... | ... |
| Vehicle control function (Emergency brake) | M2, M4 | P3, P7 | ON | High |
| | | | OFF | Low |

FIG. 10

| Log ID | Save priority level | Priority level setting time |
|---|---|---|
| M1 | Low | T40 |
| M2 | High | T41 |
| M3 | Medium | — |
| ... | ... | ... |
| M4 | High | T41 |
| P1 | Low | T40 |
| P2 | Low | T40 |
| P3 | High | T41 |
| P4 | High | T41 |
| P5 | Medium | — |
| P6 | Medium | — |
| P7 | High | T41 |
| ... | ... | ... |
| P8 | Medium | — |

VEHICLE LOG TRANSMISSION DEVICE, VEHICLE LOG COLLECTION SYSTEM, VEHICLE LOG TRANSMISSION METHOD, AND SAVE PRIORITY LEVEL CHANGING DEVICE

CROSS REFERENCE TO RELATED APPLICATIONS

This is a continuation application of PCT International Application No. PCT/JP2020/047529 filed on Dec. 18, 2020, designating the United States of America, which is based on and claims priority of PCT International Application No. PCT/JP2020/000922 filed on Jan. 14, 2020. The entire disclosures of the above-identified applications, including the specifications, drawings and claims are incorporated herein by reference in their entirety.

FIELD

The present disclosure relates to a vehicle log transmission device, a vehicle log collection system, a vehicle log transmission method, and a save priority level changing device.

BACKGROUND

Recently, many devices called Electronic Control Units (ECUs) are being provided in systems in automobiles. A network which connects these ECUs is called an "in-vehicle network". There are many in-vehicle network standards. The standard known as Controller Area Network (CAN), defined by ISO 11898-1, is the most mainstream standard for in-vehicle networks.

In a CAN, a communication path is constituted by two buses, and ECUs connected to the buses are called "nodes". Each node connected to a bus transmits and receives messages called "frames". CAN does not have identifiers indicating transmission destination nodes or transmission source nodes. Instead, a transmitting node adds an ID called a "message ID" to each frame before transmitting the frame, and each receiving node receives only a predetermined message ID. As such, there is a threat in that improper control of an automobile can be achieved by connecting an ECU to a CAN bus and transmitting frames including anomalous control commands by impersonating a legitimate ECU.

In light of this threat, PTL 1 discloses a method for detecting infiltrations by improper data on an in-vehicle network or the like. If, using the technique of PTL 1, a server outside a vehicle monitors and analyzes data in an in-vehicle system, it is possible that large amounts of data will be transmitted from the in-vehicle system to the server outside the vehicle. Meanwhile, PTL 2 discloses a method for reducing the amount of communication data by switching logs to be transmitted to a server according to the level of a detected anomaly for large amounts of data (logs).

CITATION LIST

Patent Literature

PTL 1: Japanese Unexamined Patent Application Publication No. 2014-146868
PTL 2: Japanese Unexamined Patent Application Publication No. 2019-125867

SUMMARY

Technical Problem

However, with the techniques disclosed in PTL 1 and 2, it is necessary to store logs for transmission to the servers for long periods of time, and it is not easy to provide resources (storage space in a storage device) for saving logs for long periods of time in the vehicle. Additionally, when saved logs are to be deleted in order from older logs, data required for analysis by the server outside the vehicle may end up being deleted.

Accordingly, the present disclosure relates to a vehicle log transmission device, a vehicle log collection system, and a vehicle log transmission method capable of storing logs necessary for analysis by a server, even when resources for saving the logs are limited.

Solution to Problem

To solve the above-described problem, a vehicle log transmission device according to one aspect of the present disclosure is a vehicle log transmission device that transmits a vehicle log to a vehicle log collection server, the vehicle log being saved in at least one electronic control unit installed in a vehicle and including at least one instance of log information related to the vehicle. The vehicle log transmission device includes: an anomaly detector that obtains the vehicle log from the at least one electronic control unit, detects an anomaly based on the at least one instance of log information included in the vehicle log obtained, and extracts log information in which the anomaly is detected as an anomaly log; an anomaly notifier that transmits the anomaly log to the vehicle log collection server; a change instructor that, based on a vehicle state extracted from the vehicle log, transmits, to the at least one electronic control unit, a change instruction to change a save priority level of the at least one instance of log information included in the vehicle log, the save priority level indicating a priority level for keeping the at least one instance of log information; and a vehicle log request responder that, when a vehicle log request requesting the vehicle log to be transmitted from the vehicle log collection server is received, obtains the vehicle log including log information saved based on the save priority level changed in response to the change instruction from the at least one electronic control unit, and transmits the vehicle log obtained to the vehicle log collection server.

Additionally, to solve the above-described problem, a vehicle log collection system according to one aspect of the present disclosure includes the above-described vehicle log transmission device, the at least one electronic control unit installed in the vehicle, and the vehicle log collection server. Each of the at least one electronic control unit includes: a vehicle log priority level setter that changes the save priority level of the vehicle log in accordance with the change instruction to change the save priority level of the vehicle log received from the vehicle log transmission device; a vehicle log deleter that, according to the save priority level of the vehicle log, deletes, from the at least one instance of log information included in the vehicle log, log information based on the save priority level; and a vehicle log request responder that, in accordance with the vehicle log request received from the vehicle log transmission device, transmits the vehicle log stored in the electronic control unit to the vehicle log transmission device. The vehicle log collection server includes: an anomaly log receiver that receives the anomaly log from the vehicle log transmission device; a vehicle log requester that transmits the vehicle log request to the vehicle log transmission device; and a vehicle log receiver that receives the vehicle log based on the vehicle log request from the vehicle log transmission device.

Additionally, to solve the above-described problem, a vehicle log transmission method according to one aspect of the present disclosure is a vehicle log transmission method of transmitting a vehicle log to a vehicle log collection server, the vehicle log being saved in at least one electronic control unit installed in a vehicle and including at least one instance of log information related to the vehicle. The vehicle log transmission method includes: obtaining the vehicle log from the at least one electronic control unit, detecting an anomaly based on the at least one instance of log information included in the vehicle log obtained, and extracting log information in which the anomaly is detected as an anomaly log; transmitting the anomaly log to the vehicle log collection server; transmitting, to the at least one electronic control unit, based on a vehicle state extracted from the vehicle log, a change instruction to change a save priority level of the at least one instance of log information included in the vehicle log, the save priority level indicating a priority level for keeping the log information; and when a vehicle log request requesting the vehicle log to be transmitted from the vehicle log collection server is received, obtaining the vehicle log including log information saved based on the save priority level changed in response to the change instruction from the at least one electronic control unit, and transmitting the vehicle log obtained to the vehicle log collection server.

Additionally, to solve the above-described problem, a save priority level changing device according to one aspect of the present disclosure includes: an anomaly detector that obtains a vehicle log including at least one instance of log information pertaining to a vehicle from at least one electronic control unit that saves the vehicle log and that is installed in the vehicle, detects an anomaly based on the at least one instance of log information included in the vehicle log obtained, and extracts log information in which the anomaly is detected as an anomaly log; an anomaly notifier that transmits the anomaly log to a vehicle log collection server; and a change instructor that, based on a vehicle state extracted from the vehicle log, transmits, to the at least one electronic control unit, a change instruction to change a save priority level of the at least one instance of log information included in the vehicle log, the save priority level indicating a priority level for keeping the log information.

Advantageous Effects

According to a vehicle log transmission device and the like according to one aspect of the present disclosure, logs necessary for analysis by a server can be stored even when resources for saving the logs are limited.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 is a block diagram illustrating a vehicle log collection server according to an embodiment.

FIG. 6 is a diagram illustrating an example of a vehicle log in an in-vehicle network according to an embodiment.

FIG. 7 is a diagram illustrating an example of a vehicle log in an ECU according to an embodiment.

FIG. 8 is a diagram illustrating an example of an anomaly log according to an embodiment.

FIG. 9 is a diagram illustrating an example of a related vehicle log list according to an embodiment.

FIG. 10 is a diagram illustrating an example of vehicle log save priority level settings according to an embodiment.

DESCRIPTION OF EMBODIMENTS

Findings Leading to Present Disclosure

Figure 1:
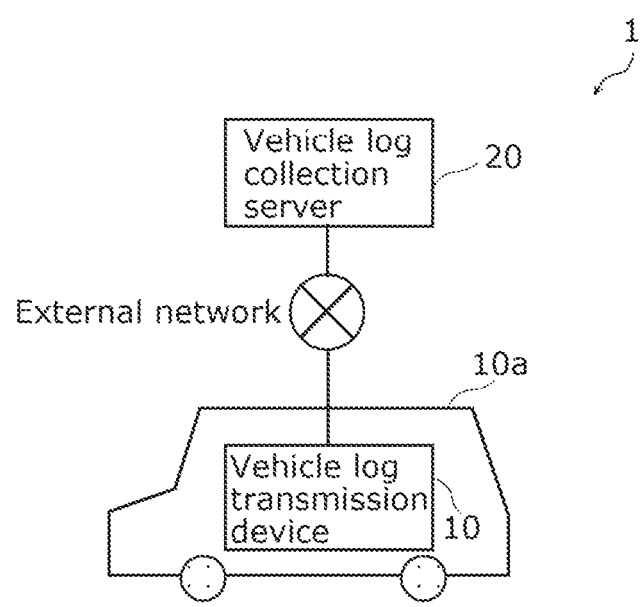
FIG. 1 is an overall block diagram illustrating a vehicle log collection system according to an embodiment.

In recent years, automobiles are increasingly being controlled electronically, and there is thus a threat that automobiles can be operated improperly by spoofing control commands. To deal with such a threat, having a server outside the vehicle collect, monitor, and analyze logs from a plurality of in-vehicle systems (a plurality of vehicles) is being considered. When the server determines the level of anomaly based on the logs of a plurality of vehicles or anomalies detected in a plurality of vehicles, it is necessary for the in-vehicle system to transmit the log after obtaining a response (a vehicle log request) from the server, making it necessary to save the log in the vehicle for a long period of time.

Resources for saving logs in a vehicle (storage capacity in a storage device) are limited, and thus it is desirable for data necessary for monitoring and analysis by the server to be saved (kept). The inventors of the present application diligently studied vehicle log transmission devices and the like capable of effectively saving data necessary for monitoring and analysis by a server, and found that switching the log to be stored preferentially according to the vehicle state when an anomaly is detected makes it possible to keep logs necessary for analysis by the server in the vehicle preferentially even when the amount of data saved in the vehicle log exceeds an upper limit.

A vehicle log transmission device according to one aspect of the present disclosure is a vehicle log transmission device that transmits a vehicle log to a vehicle log collection server, the vehicle log being saved in at least one electronic control unit installed in a vehicle and including at least one instance of log information related to the vehicle. The vehicle log transmission device includes: an anomaly detector that obtains the vehicle log from the at least one electronic control unit, detects an anomaly based on the at least one instance of log information included in the vehicle log obtained, and extracts log information in which the anomaly is detected as an anomaly log; an anomaly notifier that transmits the anomaly log to the vehicle log collection server; a change instructor that, based on a vehicle state extracted from the vehicle log, transmits, to the at least one electronic control unit, a change instruction to change a save priority level of the at least one instance of log information included in the vehicle log, the save priority level indicating a priority level for keeping the at least one instance of log information; and a vehicle log request responder that, when a vehicle log request requesting the vehicle log to be transmitted from the vehicle log collection server is received, obtains the vehicle log including log information saved based on the save priority level changed in response to the change instruction from the at least one electronic control unit, and transmits the vehicle log obtained to the vehicle log collection server.

Through this, when an anomaly is detected, the vehicle log transmission device can transmit, to the vehicle log collection server (a server), a vehicle log including log information kept (not deleted) due to the save priority level based on the vehicle state. The log information based on the vehicle state is kept in the electronic control unit preferentially, and thus log information useful for analysis in the vehicle log collection server is stored. Accordingly, the vehicle log transmission device can store logs necessary for analysis by the server even when resources for saving the logs are limited.

Additionally, for example, the anomaly detector may further store an anomaly detection time indicating a time at which the anomaly is detected, and the change instructor may transmit the change instruction to change the save priority level to the at least one electronic control unit based on the anomaly detection time.

Through this, the vehicle log transmission device can transmit the change instruction to change the save priority level at a timing based on the anomaly detection time. In other words, even when an anomaly is not detected, the vehicle log transmission device can transmit the change instruction to change the save priority level at the stated timing. Accordingly, the vehicle log transmission device can store (keep) log information based on the vehicle state at the stated timing.

Additionally, for example, the change instructor may transmit the change instruction to change the save priority level to the at least one electronic control unit when a first time has elapsed after the anomaly detection time.

Through this, even if no anomaly is detected after the anomaly detection time, the vehicle log transmission device can change the save priority level once the first time passes after the anomaly detection time. Accordingly, even if no anomaly is detected, the vehicle log transmission device can set the save priority level according to the status at that time, which makes it possible to store logs useful for analysis in the server.

Additionally, for example, the change instructor may set the save priority level after the change based on a communication ID included in an in-vehicle message in an in-vehicle network of the vehicle, a process ID of an operating system or an application executed by the at least one electronic control unit, and the vehicle state.

Through this, the vehicle log transmission device can manage the save priority levels of vehicle logs by confirming IDs included in the vehicle logs, which makes it possible to identify necessary vehicle logs. Additionally, the vehicle log transmission device can set the save priority level in the vehicle log transmission device itself based on the communication ID and process ID, and the vehicle state.

Additionally, for example, the vehicle state may include a plurality of states in the vehicle, and the change instructor may set the save priority level after the change for each of the plurality of states based on a degree indicating whether to preferentially keep log information corresponding to the communication ID related to the vehicle state and log information corresponding to the process ID related to the vehicle state.

Through this, the vehicle log transmission device can determine whether to keep a vehicle log based on at least one vehicle state such as the travel mode, the Internet connection status, each vehicle control function status, and the like. The vehicle log transmission device can therefore set an appropriate save priority level.

Additionally, for example, the change instructor may use, as the vehicle state, a state including at least one of a travel mode indicating whether the vehicle is driving autonomously or being driven manually, a travel status indicating whether the vehicle is traveling or stopped, an Internet connection status indicating whether the vehicle is connected to the Internet or is not connected to the Internet, a first vehicle control function status indicating whether an autonomous parking function is on or off, a second vehicle control function status indicating whether a cruise control function is on or off, or a third vehicle control function status indicating whether an emergency brake is on or off.

Through this, the vehicle log transmission device can set the save priority level based on the vehicle state. For example, the vehicle log transmission device can determine whether to keep a vehicle log based on whether important functions related to vehicle body control, such as autonomous driving and autonomous parking, and important functions used by an attacker to take over a vehicle, such as the presence of an Internet connection, are enabled in the in-vehicle system. The vehicle log transmission device can therefore set a more appropriate save priority level.

Additionally, for example, the change instructor may instruct the at least one electronic control unit to make at least one of the following changes: changing the save priority level for a function related to autonomous driving to a second priority level higher than a first priority level when the travel mode is an autonomous driving mode; changing the save priority level for the function related to autonomous driving to a third priority level lower than the first priority level when the travel mode is a manual driving mode; changing the save priority level for a function related to a vehicle body control function including a door lock function to a fifth priority level lower than a fourth priority level when the vehicle is traveling; changing the save priority level for the function related to the vehicle body control function to a sixth priority level higher than the fourth priority level when the vehicle is stopped; changing the save priority level for a function that uses an Internet connection to an eighth priority level higher than a seventh priority level when the vehicle is connected to the Internet; changing the save priority level for the function that uses the Internet connection to an eighth priority level lower than the seventh priority level when the vehicle is not connected to the Internet; changing the save priority level for a first vehicle control function related to the autonomous parking function to a tenth priority level higher than a ninth priority level when the autonomous parking function is on; changing the save priority level for the first vehicle control function related to the autonomous parking function to an eleventh priority level lower than the ninth priority level when the autonomous parking function is off; changing the save priority level for a second vehicle control function related to the cruise control function to a thirteenth priority level higher than a twelfth priority level when the cruise control function is on; changing the save priority level for the second vehicle control function related to the cruise control function to a fourteenth priority level lower than the twelfth priority level when the cruise control function is off; changing the save priority level for a third vehicle control function related to an emergency brake function to a sixteenth priority level higher than a fifteenth priority level when the emergency brake function is on; and changing the save priority level for the third vehicle control function related to the emergency brake function to an eighteenth priority level lower than the fifteenth priority level when the emergency brake function is off.

Through this, the vehicle log transmission device can set the save priority level based on the vehicle state. When, for example, the travel mode is manual driving, vehicle logs such as camera images related to autonomous driving are not as useful as the position of the accelerator pedal, the steering wheel angle, and the like during manual driving, and thus the vehicle log transmission device can lower the save priority level. When, for example, the vehicle is stopped, there is a higher risk of vehicle theft than when the vehicle is traveling, and thus the vehicle log transmission device can raise the save priority level for logs of functions related to vehicle body control, such as locking doors, opening doors, and the like. When, for example, the vehicle is connected to the Internet, the vehicle log transmission device can raise the save priority level for functions which use an Internet connection, such as online software updates. Additionally, for example, when a specific vehicle control function is on, the importance in terms of analysis is higher than when the specific vehicle control function is off, and thus the vehicle log transmission device can raise the save priority level.

Additionally, for example, the anomaly notifier may further generate an anomaly log identifier corresponding one-to-one with the anomaly log, and transmit the anomaly detection time and the anomaly log identifier to the vehicle log collection server; and the vehicle log request responder may receive the anomaly log identifier from the vehicle log collection server, collect log information in a set period before and after the anomaly detection time corresponding to the anomaly log identifier from the at least one electronic control unit, and transmit the vehicle log including the log information collected to the vehicle log collection server.

Through this, the vehicle log collection server can collect vehicle logs from before and after the anomaly, which are useful for analyzing the anomaly, simply by notifying the vehicle log transmission device of the anomaly log identifier.

Additionally, a vehicle log collection system according to one aspect of the present disclosure includes the above-described vehicle log transmission device, the at least one electronic control unit installed in the vehicle, and the vehicle log collection server. Each of the at least one electronic control unit includes: a vehicle log priority level setter that changes the save priority level of the vehicle log in accordance with the change instruction to change the save priority level of the vehicle log received from the vehicle log transmission device; a vehicle log deleter that, according to the save priority level of the vehicle log, deletes, from the at least one instance of log information included in the vehicle log, log information based on the save priority level; and a vehicle log request responder that, in accordance with the vehicle log request received from the vehicle log transmission device, transmits the vehicle log stored in the electronic control unit to the vehicle log transmission device. The vehicle log collection server includes: an anomaly log receiver that receives the anomaly log from the vehicle log transmission device; a vehicle log requester that transmits the vehicle log request to the vehicle log transmission device; and a vehicle log receiver that receives the vehicle log based on the vehicle log request from the vehicle log transmission device.

Through this, in the vehicle log collection system, the vehicle log transmission device changes the save priority level of a vehicle log important in a specific vehicle state, and thus even if a long period of time has passed between the detection of an anomaly and the reception of the vehicle log request, a vehicle log having a high save priority level can be kept when the electronic control unit periodically deletes vehicle logs. Accordingly, the vehicle log collection system can save a vehicle log necessary for analysis by the vehicle log collection server without the electronic control unit using a large amount of resources, and can also provide that vehicle log to the vehicle log collection server.

Additionally, for example, the vehicle log deleter may delete log information for which the save priority level is low when a second time passes or when a size of the vehicle log stored is at least a set value.

Through this, the vehicle log deleter can continue to save a vehicle log having a high save priority level without exceeding the limit on the size of the memory in the electronic control unit.

Additionally, for example, when the size of the vehicle log is at least the set value after the log information for which the save priority level is low is deleted, the vehicle log deleter may further delete log information for which the save priority level is high, in order from oldest log information.

Through this, the vehicle log deleter can continue to hold logs having a higher save priority level among logs having a high save priority level by using the time when the size of the stored logs is still large, even when deleting logs having lower save priority levels. The vehicle log deleter may, for example, delete the logs in such a manner that logs closer to the anomaly detection time or newer logs are kept preferentially.

Additionally, for example, after the vehicle log request responder transmits the vehicle log to the vehicle log transmission device, the vehicle log deleter may delete the vehicle log transmitted.

Through this, the vehicle log deleter deletes a vehicle log already transmitted to the server even if the log has a high save priority level, which makes it possible to delete unnecessary logs and free up storage space in the electronic control unit.

Additionally, for example, the vehicle log collection server may further include a vehicle log request determiner that determines whether the vehicle log request is necessary based on the anomaly log.

Through this, by determining whether a vehicle log is necessary on the server side, the vehicle log collection system can reduce the amount of communication compared to a case where a vehicle log is transmitted each time an anomaly is detected in the vehicle. For example, when a module in which an anomaly log is produced is a module related to safety, the vehicle log collection server can collect only the important logs by requesting those vehicle logs.

Additionally, for example, the vehicle log request determiner may determine whether the vehicle log request is necessary based on a total number of times the anomaly log is received.

Through this, the vehicle log collection server can transmit a vehicle log request when, for example, the same anomaly log is transmitted a plurality of times from other vehicles, which indicates a higher likelihood that a particular attack or malware is spreading and needs to be analyzed urgently, as opposed to an anomaly log that occurs only once.

Additionally, a vehicle log transmission method according to one aspect of the present disclosure is a vehicle log transmission method of transmitting a vehicle log to a vehicle log collection server, the vehicle log being saved in at least one electronic control unit installed in a vehicle and including at least one instance of log information related to the vehicle. The vehicle log transmission method includes: obtaining the vehicle log from the at least one electronic control unit, detecting an anomaly based on the at least one instance of log information included in the vehicle log obtained, and extracting log information in which the anomaly is detected as an anomaly log; transmitting the anomaly log to the vehicle log collection server; transmitting, to the at least one electronic control unit, based on a vehicle state extracted from the vehicle log, a change instruction to change a save priority level of the at least one instance of log information included in the vehicle log, the save priority level indicating a priority level for keeping the log information; and when a vehicle log request requesting the vehicle log to be transmitted from the vehicle log collection server is received, obtaining the vehicle log including log information saved based on the save priority level changed in response to the change instruction from the at least one electronic control unit, and transmitting the vehicle log obtained to the vehicle log collection server.

This provides the same effects as the above-described vehicle log transmission device.

Additionally, a save priority level changing device according to one aspect of the present disclosure includes: an anomaly detector that obtains a vehicle log including at least one instance of log information pertaining to a vehicle from at least one electronic control unit that saves the vehicle log and that is installed in the vehicle, detects an anomaly based on the at least one instance of log information included in the vehicle log obtained, and extracts log information in which the anomaly is detected as an anomaly log; an anomaly notifier that transmits the anomaly log to a vehicle log collection server; and a change instructor that, based on a vehicle state extracted from the vehicle log, transmits, to the at least one electronic control unit, a change instruction to change a save priority level of the at least one instance of log information included in the vehicle log, the save priority level indicating a priority level for keeping the log information.

Through this, by transmitting the save priority level based on the vehicle state when an anomaly is detected, the save priority level changing device can keep log information useful for analysis by the vehicle log collection server (the server) in the electronic control unit. Accordingly, the save priority level changing device can store logs necessary for analysis by the server can be stored even when resources for saving the logs are limited.

Note that these comprehensive or specific aspects may be realized by a system, a method, an integrated circuit, a computer program, or a computer-readable recording medium such as a CD-ROM, or may be implemented by any desired combination of systems, devices, methods, integrated circuits, computer programs, or recording media.

A vehicle log transmission device according to an embodiment will be described hereinafter with reference to the drawings. Each of the following embodiments describes a specific example of the present disclosure. As such, the numerical values, constituent elements, arrangements and connection states of constituent elements, steps serving as elements of processing, orders of steps, and the like in the following embodiments are merely examples, and are not intended to limit the present disclosure. Additionally, of the constituent elements in the following embodiments, constituent elements not denoted in the independent claims are considered to be optional constituent elements. Additionally, the drawings are schematic diagrams, and are not necessarily exact illustrations.

Embodiment

Overall Block Diagram of Vehicle Log Collection System

FIG. 1 is an overall block diagram illustrating a vehicle log collection system according to the present embodiment.

In FIG. 1, vehicle log collection system 1 includes vehicle log transmission device 10 and vehicle log collection server 20, and vehicle log transmission device 10 and vehicle log collection server 20 are communicably connected over an external network such as the Internet. Vehicle log transmission device 10 is installed in vehicle 10a, for example. A vehicle log in the following includes at least one instance of log information pertaining to vehicle 10a.

Vehicle log transmission device 10 is connected to an in-vehicle network, obtains vehicle logs from devices connected to the in-vehicle network, and detects anomalies, which are security threats, from the vehicle log. Vehicle log transmission device 10 then transmits an anomaly log, which is a part of the vehicle log where an anomaly has been detected, to vehicle log collection server 20, and transmits the vehicle log in response to a request (a vehicle log request) from vehicle log collection server 20. The vehicle log and the anomaly log will be described in detail later. Note that the anomaly log includes at least one instance of log information. Additionally, the "request" includes a request to transmit a vehicle log used to analyze the anomaly log. The part where the anomaly is detected is an example of log information in which an anomaly is detected.

Vehicle log collection server 20 is a server that receives the anomaly log and the vehicle log from vehicle log transmission device 10, and is used for the purpose of providing logs to a security incident response team in a security operation center in order to analyze the cause of the anomaly.

Block Diagram of Vehicle Log Transmission Device

Figure 2:
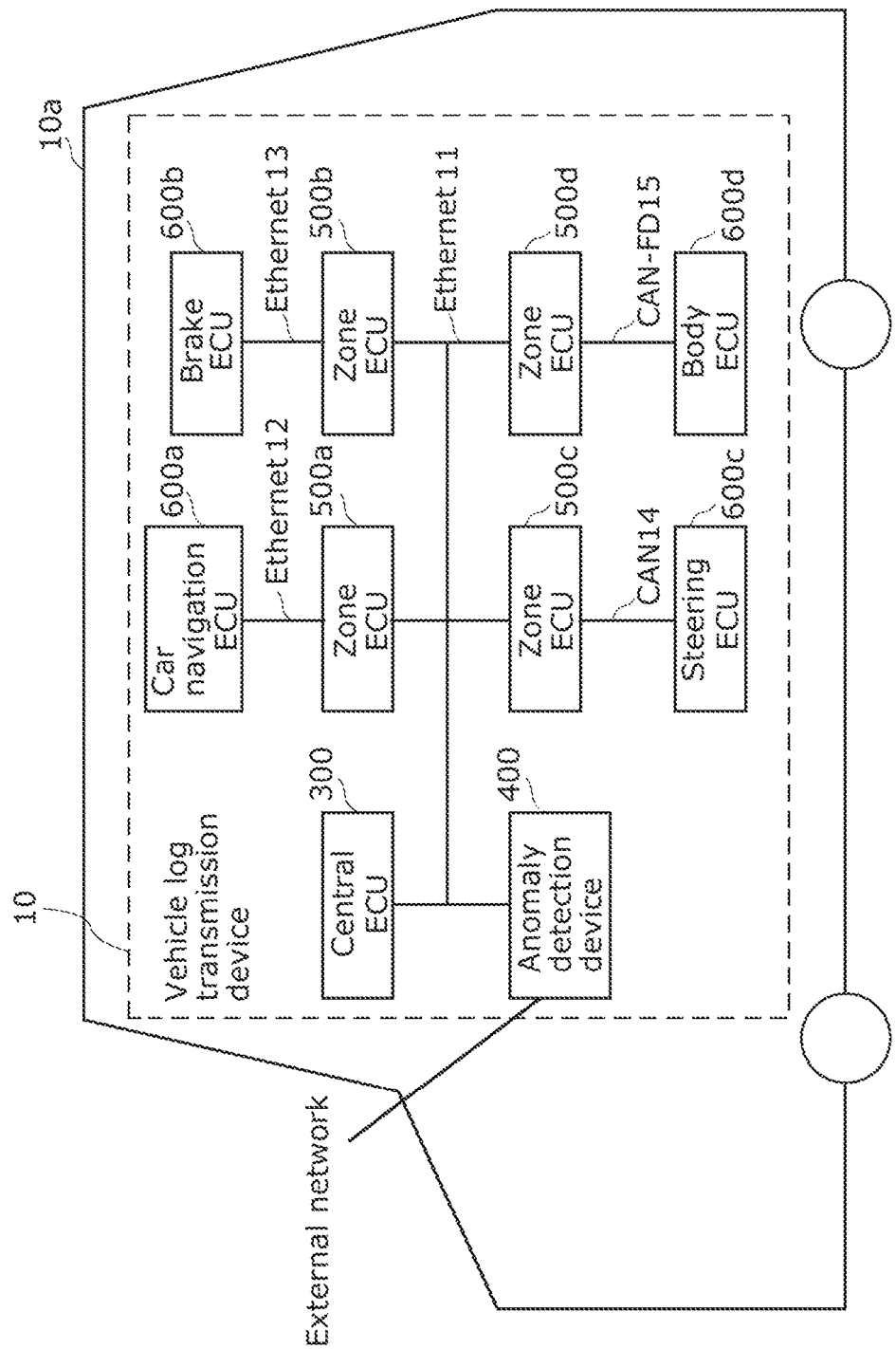
FIG. 2 is a block diagram illustrating a vehicle log transmission device according to an embodiment.

FIG. 2 is a block diagram illustrating vehicle log transmission device 10 according to the present embodiment.

In FIG. 2, vehicle log transmission device 10 includes central ECU 300, anomaly detection device 400, Zone ECU 500a, Zone ECU 500b, Zone ECU 500c, Zone ECU 500d, car navigation ECU 600a, brake ECU 600b, steering ECU 600c, and body ECU 600d. Central ECU 300, Zone ECU 500a, Zone ECU 500b, Zone ECU 500c, and Zone ECU 500d are connected over Ethernet (registered trademark; the same applies hereinafter) 11, which is an in-vehicle network. Additionally, car navigation ECU 600a and Zone ECU 500a are connected over Ethernet 12, and brake ECU 600b and Zone ECU 500b are connected over Ethernet 13. Additionally, steering ECU 600c and Zone ECU 500c are connected over CAN 14, and body ECU 600d and Zone ECU 500d are connected over CAN-FD 15. Central ECU 300 and anomaly detection device 400 are also connected to an external network. Note that in the following, Zone ECUs 500a to 500d may also be referred to as ECU group 500a. In each of Zone ECUs 500a to 500d, a vehicle log including log information according to that Zone ECU is saved. For example, the vehicle logs in the respective Zone ECUs 500a to 500d include mutually-different log information.

Although FIG. 2 illustrates an example in which vehicle log transmission device 10 includes the ECUs and the like, it is sufficient for at least anomaly detection device 400 to be included. The following will describe an example in which vehicle log transmission device 10 is realized by anomaly detection device 400. In other words, in the present embodiment, vehicle log collection system 1 can also be said to include vehicle log transmission device 10, ECU group 500a, and vehicle log collection server 20. Additionally, in vehicle log collection system 1 in the present embodiment, vehicle log transmission device 10 and ECU group 500a are installed in vehicle 10a and connected to the in-vehicle network. Vehicle log collection system 1 includes at least one vehicle 10a in which vehicle log transmission device 10 and ECU group 500a are installed. Vehicle log collection system 1 includes a plurality of vehicles 10a, for example.

Vehicle log transmission device 10 transmits, to vehicle log collection server 20, a vehicle log including at least one instance of log information pertaining to vehicle 10a, the vehicle log being saved in ECU group 500a (an example of at least one electronic control unit) installed in vehicle 10a. Vehicle log transmission device 10 collects the vehicle logs stored in central ECU 300 and ECU group 500a from those ECUs over Ethernet 11 and detects an anomaly from the vehicle logs. When an anomaly is detected, vehicle log transmission device 10 transmits an anomaly log to vehicle log collection server 20 over the external network. Additionally, upon obtaining a request to transmit a vehicle log corresponding to an anomaly log from vehicle log collection server 20 (a vehicle log request), vehicle log transmission device 10 obtains that vehicle log from central ECU 300 and ECU group 500a and transmits the vehicle log to vehicle log collection server 20.

Central ECU 300 is connected to anomaly detection device 400 and ECU group 500a over Ethernet 11. Central ECU 300 controls ECU group 500a, and controls the vehicle system as a whole. Central ECU 300 controls vehicle control functions such as autonomous parking, autonomous driving, and the like, for example.

Anomaly detection device 400 is connected to central ECU 300 and ECU group 500a over Ethernet 11. Anomaly detection device 400 obtains the vehicle logs from ECU group 500a, and detects anomalies, which are security threats to vehicle 10a, based on at least one instance of log information included in the obtained vehicle logs. Anomaly detection device 400 then extracts the log information in which an anomaly is detected at the time of anomaly detection as an anomaly log. Additionally, anomaly detection device 400 notifies ECU group 500a of vehicle logs to be saved preferentially when an anomaly is detected. When a vehicle log request is received from vehicle log collection server 20, anomaly detection device 400 collects the vehicle logs from ECU group 500a and transmits the vehicle logs to vehicle log collection server 20.

Zone ECU 500a, Zone ECU 500b, Zone ECU 500c, and Zone ECU 500d communicate with central ECU 300 and other Zone ECUs, respectively, over Ethernet 11. Zone ECU 500a is an ECU that communicates with car navigation ECU 600a over Ethernet 12 and controls the display of a car navigation device. Zone ECU 500b is an ECU that communicates with brake ECU 600b over Ethernet 13 and controls the brakes. Zone ECU 500c is an ECU that communicates with steering ECU 600c over CAN 14 and controls a steering wheel. Zone ECU 500d is an ECU that communicates with body ECU 600d over CAN-FD 15 and controls functions pertaining to the vehicle body, such as the locks, windshield wipers, and the like of vehicle 10a.

Car navigation ECU 600a is an ECU that controls the display of a car navigation device installed in vehicle 10a. Brake ECU 600b is an ECU that controls the brakes installed in vehicle 10a. Steering ECU 600c is an ECU that controls the steering of a steering wheel installed in vehicle 10a. Body ECU 600d is an ECU that controls functions pertaining to the vehicle body, such as the locks, the windshield wipers, and the like of vehicle 10a, installed in vehicle 10a.

Block Diagram of Anomaly Detection Device

Figure 3:
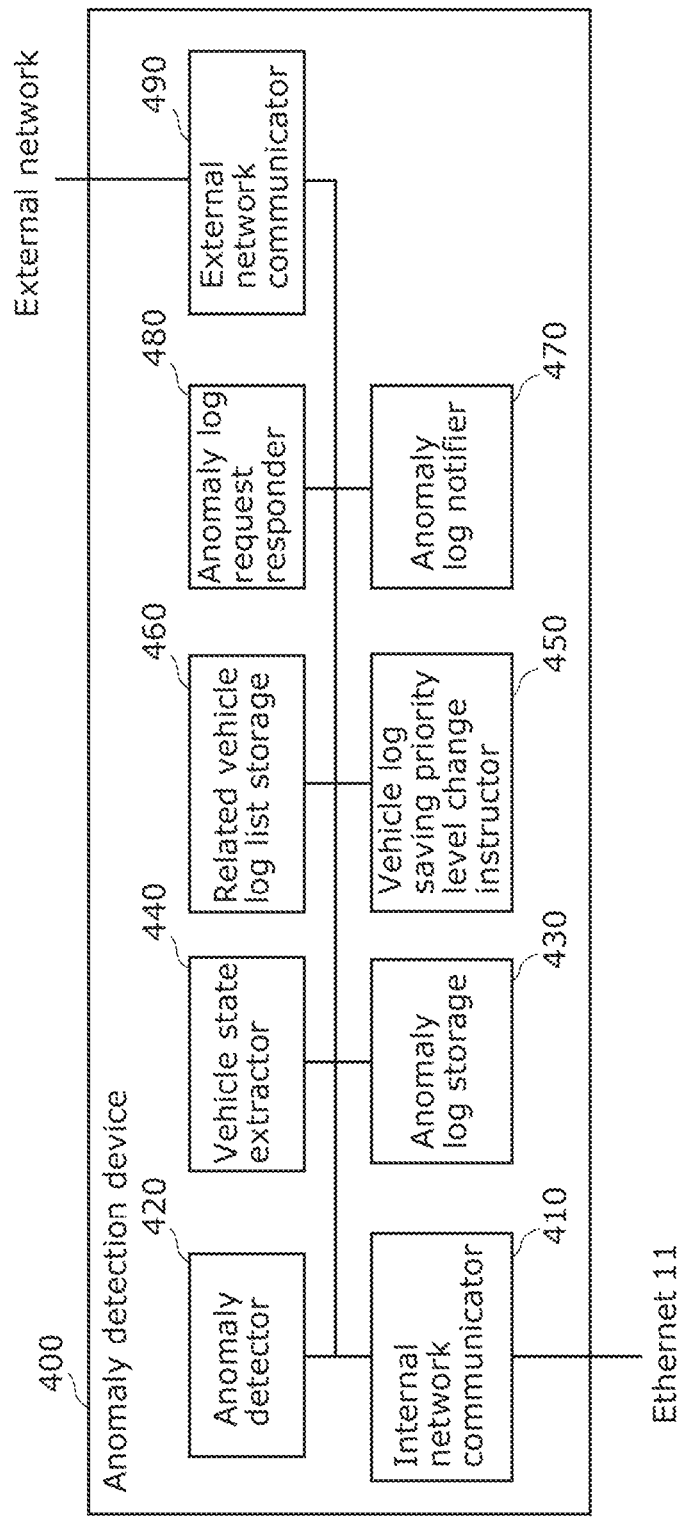
FIG. 3 is a block diagram illustrating an anomaly detection device according to an embodiment.

FIG. 3 is a block diagram illustrating anomaly detection device 400 according to the present embodiment. In the present embodiment, FIG. 3 is also a block diagram of vehicle log transmission device 10.

In FIG. 3, anomaly detection device 400 includes internal network communicator 410, anomaly detector 420, anomaly log storage 430, vehicle state extractor 440, vehicle log save priority level change instructor 450, related vehicle log list storage 460, anomaly log notifier 470, vehicle log request responder 480, and external network communicator 490. Note that a save priority level changing device is constituted by anomaly detector 420, vehicle log save priority level change instructor 450, and anomaly log notifier 470.

Internal network communicator 410 has a function for communicating with ECU group 500a over Ethernet 11. Internal network communicator 410 is configured including, for example, a communication circuit (communication module).

Anomaly detector 420 has a function for collecting the vehicle logs from ECU group 500a; detecting an anomaly, which is a security threat, based on at least one instance of log information included in the obtained vehicle logs; extracting log information corresponding to a part of the vehicle log where the anomaly is detected as an anomaly log; and storing the anomaly log in anomaly log storage 430. Here, the "vehicle log" is a log including at least one of a log (log information) of an operating system of ECU group 500a, an application log (log information), or a communication log (log information) of the in-vehicle network. The communication log is a log including at least one of the in-vehicle networks, i.e., Ethernet 11, Ethernet 12, Ethernet 13, CAN 14, and CAN-FD 15.

Anomaly detector 420 may further detect an anomaly detection time, which is the time at which the anomaly is detected, and store that time in anomaly log storage 430.

Anomaly log storage 430 has a function for storing the log detected by anomaly detector 420. Anomaly log storage 430 is realized by semiconductor memory or the like, but is not limited thereto.

Vehicle state extractor 440 has a function for collecting the vehicle logs from ECU group 500a and extracting a vehicle state from the vehicle logs. Here, the vehicle state includes a plurality of states in vehicle 10a (see FIG. 9, described later). The vehicle state includes at least one of a travel mode, a travel status, an Internet connection status, and a vehicle control function status (e.g., the status of an autonomous driving function, the status of a cruise control function, and the status of an emergency brake) of vehicle 10a. "Travel mode" refers to a current mode of travel by vehicle 10a, and includes whether vehicle 10a is driving autonomously (an autonomous driving mode) or being driven manually (a manual driving mode). The travel mode may also include whether the vehicle is being controlled remotely (a remote control mode). The travel status includes whether vehicle 10a is traveling or is stopped. The Internet connection status includes whether the vehicle is or is not connected to the Internet. The autonomous driving function status includes whether an autonomous parking function is on or off. The cruise control function status includes whether the cruise control function (CC function) is on or off. The emergency brake status includes whether the emergency brake is on or off.

Note that the autonomous driving function status is an example of a first vehicle control function status, the cruise control function status is an example of a second vehicle control function status, and the emergency brake status is an example of a third vehicle control function status.

Vehicle log save priority level change instructor 450 has a function for obtaining the vehicle state from vehicle state extractor 440; obtaining a related vehicle log list, which is a list of IDs of vehicle logs prioritized for each vehicle state stored in related vehicle log list storage 460; and communicating (transmitting) the list to ECU group 500a. Based on the vehicle state extracted from the vehicle log, vehicle log save priority level change instructor 450 transmits, to ECU group 500a, a change instruction to change a save priority level in the at least one instance of log information included in the vehicle log, the save priority level indicating a priority level for keeping the log information. The save priority level can also be called a priority level for keeping the log information, for example. When anomaly detector 420 detects the anomaly detection time, vehicle log save priority level change instructor 450 may further transmit the change instruction to change the save priority level to ECU group 500a based on the anomaly detection time. The related vehicle log list and the method for changing the vehicle log save priority level will be described later. Note that vehicle log save priority level change instructor 450 is an example of a change instructor.

Related vehicle log list storage 460 has a function for storing a related vehicle log list. Related vehicle log list storage 460 is realized by semiconductor memory or the like, but is not limited thereto.

Anomaly log notifier 470 has a function for transmitting the anomaly log detected by anomaly detector 420 to vehicle log collection server 20. Anomaly log notifier 470 is an example of an anomaly notifier.

Vehicle log request responder 480 has a function for, upon a vehicle log request being received, collecting the vehicle logs from ECU group 500a and transmitting the vehicle logs to vehicle log collection server 20, if the vehicle log request is received from vehicle log collection server 20 via external network communicator 490. It can be said that upon receiving a vehicle log request for a vehicle log from vehicle log collection server 20, vehicle log request responder 480 obtains a vehicle log including log information saved based on the save priority level changed in response to the change instruction from ECU group 500a, and transmits the obtained vehicle log to vehicle log collection server 20. The obtained vehicle log is, for example, log information saved based on the save priority level change instruction.

External network communicator 490 has a function for communicating with vehicle log collection server 20 over the external network. External network communicator 490 is configured including, for example, a communication circuit (communication module).

Block Diagram of Zone ECU

Figure 4:
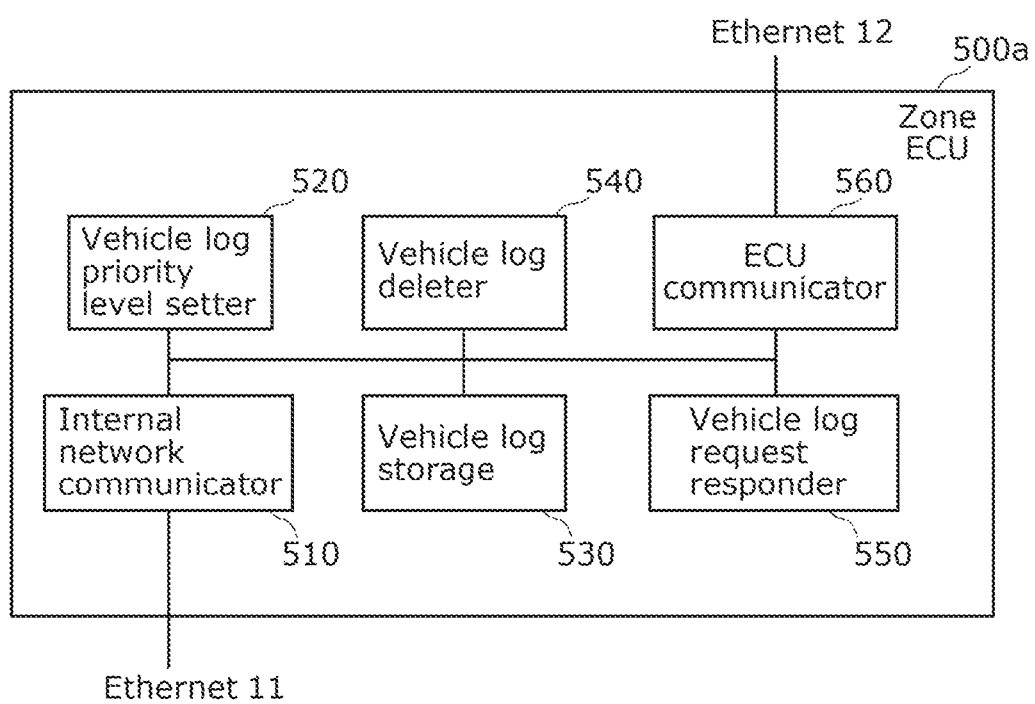
FIG. 4 is a block diagram illustrating a Zone ECU device according to an embodiment.

FIG. 4 is a block diagram of Zone ECU 500a according to the present embodiment.

In FIG. 4, Zone ECU 500a includes internal network communicator 510, vehicle log priority level setter 520, vehicle log storage 530, vehicle log deleter 540, vehicle log request responder 550, and ECU communicator 560.

Internal network communicator 510 has a function for communicating with anomaly detection device 400 and ECU group 500a over Ethernet 11. Internal network communicator 510 is configured including, for example, a communication circuit (communication module).

Vehicle log priority level setter 520 has a function for receiving a vehicle log priority level change instruction transmitted by anomaly detection device 400 and changing a priority level setting of the vehicle log according to the instruction.

Vehicle log storage 530 has a function for storing vehicle logs. Vehicle log storage 530 is realized by semiconductor memory or the like, but is not limited thereto.

Vehicle log deleter 540 has a function for deleting a vehicle log periodically or when the amount of saved data for vehicle logs reaches an upper limit. According to, for example, the save priority level of the vehicle logs, vehicle log deleter 540 deletes, from the at least one instance of log information included in the vehicle log, log information based on the save priority level. Note that the log information deleted here is, for example, log information not yet transmitted to vehicle log collection server 20. Additionally, after vehicle log request responder 550 transmits the vehicle log to vehicle log transmission device 10, vehicle log deleter 540 may delete the transmitted vehicle log. The method of deleting the vehicle log will be described in detail later.

Vehicle log request responder 550 has a function for receiving the vehicle log request transmitted by anomaly detection device 400 and transmitting (returning) a vehicle log stored in vehicle log storage 530 to anomaly detection device 400. It can also be said that vehicle log request responder 550 transmits the vehicle log stored in vehicle log storage 530 to vehicle log transmission device 10 in response to the vehicle log request received from vehicle log transmission device 10.

ECU communicator 560 has a function for communicating with car navigation ECU 600a over Ethernet 12. ECU communicator 560 is configured including, for example, a communication circuit (communication module).

Zone ECUs 500b to 500d and central ECU 300 may also have the same configuration as that illustrated in FIG. 4. In Zone ECU 500b, ECU communicator 560 is connected to brake ECU 600b; in Zone ECU 500c, ECU communicator 560 is connected to steering ECU 600c; and in Zone ECU 500d, ECU communicator 560 is connected to body ECU 600d. Central ECU 300 has, instead of ECU communicator 560, an ECU controller, and by controlling ECU group 500a, controls the vehicle system as a whole, e.g., realizes vehicle control functions such as autonomous driving, autonomous parking, cruise control, and the like. Additionally, central ECU 300 includes an external network communicator, and has a function for mediating an Internet connection of car navigation ECU 600a.

Block Diagram of Vehicle Log Collection Server

FIG. 5 is a block diagram illustrating vehicle log collection server 20 according to the present embodiment.

In FIG. 5, vehicle log collection server 20 includes external network communicator 210, anomaly log receiver 220, anomaly log storage 230, vehicle log necessity determiner 240, vehicle log requester 250, vehicle log storage 260, and log provider 270.

External network communicator 210 has a function for communicating with vehicle log transmission device 10 over the external network. External network communicator 210 is configured including, for example, a communication circuit (communication module).

Anomaly log receiver 220 has a function for receiving the anomaly log from anomaly detection device 400. It can also be said that anomaly log receiver 220 receives the vehicle log in response to the vehicle log request from vehicle log transmission device 10. In the present embodiment, anomaly log receiver 220 further has a function for receiving a vehicle log based on the vehicle log request from anomaly detection device 400. In other words, anomaly log receiver 220 also functions as a vehicle log receiver.

Anomaly log storage 230 has a function for storing the anomaly log received by anomaly log receiver 220. Anomaly log storage 230 is realized by semiconductor memory or the like, but is not limited thereto.

Vehicle log necessity determiner 240 has a function for determining whether a vehicle log is necessary based on the anomaly log stored in anomaly log storage 230. Vehicle log necessity determiner 240 may determine whether the vehicle log is necessary according to, for example, the number of times an anomaly log has been received. Vehicle log necessity determiner 240 may determine whether the vehicle log is necessary according to, for example, the number of times the same type of anomaly log has been received. The "same type of anomaly log" may be a log indicating an anomaly pertaining to the same process ID or communication ID, or may be an anomaly pertaining to the same device. Details of the method for determining the necessity of the vehicle log will be given later.

Vehicle log requester 250 has a function for transmitting a vehicle log request to anomaly detection device 400 and receiving a vehicle log when vehicle log necessity determiner 240 determines that a vehicle log is necessary. It can also be said that vehicle log requester 250 transmits a vehicle log request to vehicle log transmission device 10.

Vehicle log storage 260 has a function for storing the vehicle log received by vehicle log requester 250. Vehicle log storage 260 is realized by semiconductor memory or the like, but is not limited thereto.

Log provider 270 has a function for providing, to a user of vehicle log collection server 20, an anomaly log stored in anomaly log storage 230 and a vehicle log stored in vehicle log storage 260. The user is, for example, a member of a security incident response team in a security operation center using vehicle log collection server 20. The providing method is, for example, downloading the log, visualizing and displaying the log using a graphical interface, or the like, but is not limited thereto. Log provider 270 is constituted by a display device, an audio output device, or the like.

Example of Vehicle Log in In-Vehicle Network

FIG. 6 is a diagram illustrating an example of the vehicle log in the in-vehicle network according to the present embodiment. Vehicle logs are classified into vehicle logs in the in-vehicle network, and vehicle logs in the ECUs. The vehicle log in the ECU will be described later with reference to FIG. 7.

In FIG. 6, the vehicle log in the in-vehicle network is a log of communication messages flowing on the in-vehicle network, and the log of one communication message includes a communication ID, a time, and payload data (also referred to as "data"). The communication ID is an identifier indicating the type of the communication message. The payload data is a hexadecimal value, and the content thereof can be read by referring to a definition defined in advance for each communication ID.

For example, it can be seen that a communication message having a communication ID of "M1" was transmitted at time "T11". Additionally, in the communication message having the communication ID is "M1", the third byte of the payload data includes content indicating an Internet connection state. For example, if the third byte of the payload data is "00", a determination of "off", indicating no connection to the Internet, can be made, and if the third byte is "01", a determination of "on", indicating a connection to the Internet, can be made.

Similarly, a travel speed can be read from the payload data in the third byte and the fourth byte of the communication message having the communication ID of "M2". For example, if the speed is faster than 0 km/h, it can be determined that the travel status is "driving", and if the speed is 0 km/h, it can be determined that the travel status is "stopped"; and the presence or absence of an emergency brake instruction can be read from the payload data of the fifth byte.

Likewise, the door lock state can be read from the communication message having the communication ID of "M3", and the travel mode, vehicle control functions, steering instructions, and steering instruction angle can be read from the communication message having the communication ID of "M4". Here, "CC" in the vehicle control functions refers to the cruise control mode, which is a mode in which vehicle 10a is caused to travel autonomously while following a vehicle in front. In this manner, using the vehicle log makes it possible to ascertain the current vehicle state. Note that the communication message is an example of an in-vehicle message.

The vehicle log in the in-vehicle network can be used to detect security anomalies. For example, the steering instruction angle, for which the communication ID is "M4", is used when mechanically moving the steering wheel when the travel mode is autonomous driving or the vehicle control function is autonomous parking. The communication message having the communication ID of "M4" is received by steering ECU 600c via Zone ECU 500c. When the steering instruction is "on", steering ECU 600c manipulates the steering wheel according to the steering instruction angle. However, if a malicious attacker improperly transmits a communication message over the in-vehicle network that rewrites the steering instruction angle to an anomalous value while the steering instruction is "on", a dangerous steering operation not intended by the controlling side may be implemented. In order to detect such an attack as an anomaly, anomaly detection device 400 monitors the communication message having the communication ID of "M4" and monitors a difference between the steering instruction angles included in two consecutive communication messages; if the difference is at least a predetermined magnitude, there is a possibility that rewriting has occurred due to the attack, and this is therefore detected as an anomaly. For example, rewriting may have occurred due to an attack when the steering instruction angle changes suddenly from 0 to 90 degrees, and thus anomaly detection device 400 detects this as an anomaly.

Additionally, the vehicle log in the in-vehicle network can be used to analyze the causes of anomalies. The vehicle log in the in-vehicle network is used, for example, by a security incident response team in a security operation center. If, for example, the communication messages before and after the occurrence of an anomaly are communication messages having a communication ID of "M4", vehicle log collection server 20 can obtain the time when the anomaly occurred from the log of the communication message, and can obtain the vehicle state at the time of the anomaly detection from the communication messages having the communication IDs of "M1", "M2", and "M3" immediately before the anomaly occurred. Then, if, for example, the travel state when the anomaly is detected is "traveling" and the Internet connection state is off, it is difficult for an attacker to be near vehicle 10a during travel and it is also difficult to perform the attack over the Internet, and thus the security incident response team can infer that the cause is most likely a device physically attached to vehicle 10a or a rewrite by an attacker before traveling.

Note that anomaly detection device 400 may obtain the vehicle state at the time of anomaly detection by using the log of the communication messages having a communication ID of "M4" before and after the occurrence of the anomaly. A set of the time and the payload data for each communication ID is an example of log information.

Example of Vehicle Log in ECU

FIG. 7 is a diagram illustrating an example of a vehicle log in an ECU according to the present embodiment.

In FIG. 7, the vehicle log in the ECU is a system log output by a process of an operating system or an application of the ECU, and one system log is constituted by a process ID, a time, an ECU name, and data. The vehicle log is stored in the Zone ECU or an ECU connected to the Zone ECU.

The process ID is an identifier of the process that outputs the log, and the ECU name is the name of the ECU on which the process that outputs the log is running. The data includes the start, result, end, and the like of the process operations. For example, the system log having a process ID of "P1" is a process that was executed on car navigation ECU 600a at time "T21", and the data contains content indicating that an Internet connection was attempted and failed. Additionally, for example, the system log having a process ID of "P5" is a process that was executed on body ECU 600d at time "T25", and the data contains content indicating that a secure boot was executed and was successful.

The vehicle log in the ECU can be used to detect security anomalies. Anomaly detection device 400 can, for example, monitor the process log having a process ID of "P7" and, if a secure boot failure is confirmed, detect an anomaly as a possible implementation of improper software rewriting on central ECU 300.

Additionally, the vehicle log in the ECU can be used to analyze the causes of anomalies. The vehicle log in the ECU is used, for example, by a security incident response team in a security operation center. Vehicle log collection server 20 can obtain, for example, the time when the secure boot failure was confirmed from the vehicle logs having process IDs of "P1", "P2", "P6", and "P7", and can obtain that a login was executed from car navigation ECU 600a to central ECU 300 immediately therebefore and that a software update was executed despite car navigation ECU 600a not being connected to the network. The security incident response team can then infer the cause of the problem, which is likely to have been that an attempt to tamper with the software of central ECU 300 via car navigation ECU 600a was made by having car navigation ECU 600a install improper software, but the secure boot detected an anomaly.

Note that a set of the time, the ECU name, and the data for each process ID is an example of the log information.

Example of Anomaly Log

FIG. 8 is a diagram illustrating an example of an anomaly log according to the present embodiment. The anomaly log is a log (log information) extracted as being anomalous from the vehicle log by anomaly detector 420 of anomaly detection device 400.

In FIG. 8, the anomaly log is configured including an anomaly identifier, an anomaly detection time, a log type, a log ID, and data. The anomaly identifier is an identifier that corresponds one-to-one with a single anomaly log, and the log type, the log ID, and a hash value of the data in the anomaly log are used, for example. The anomaly detection time is written by referring to the time in the vehicle log in which anomaly detection device 400 detected an anomaly. The log type is described as "in-vehicle network" if the log in which the anomaly was detected is a vehicle log in the in-vehicle network, or "ECU" if the log in which the anomaly was detected is a vehicle log in the ECU. The data includes the payload data of the communication messages in the case of a vehicle log in the in-vehicle network, and the system log data in the case of a vehicle log in the ECU.

For example, an anomaly log having an anomaly identifier of "A1" has an anomaly detection time of "T14", a log type of "in-vehicle network", a log ID of "M4", and data of "00 01 00 01 FF 00 00 00". Additionally, for example, an anomaly log having an anomaly identifier of "A2" has an anomaly detection time of "T26", a log type of "ECU", a log ID of "P7", and data of "secure boot failed". In other words, by referring to the data in the anomaly log, it is possible to ascertain whether, when, where, and what kind of anomaly has occurred. However, it is difficult to understand the cause of the anomaly from the anomaly log alone, and vehicle logs other than the anomaly log are also required.

Example of Related Vehicle Log List

FIG. 9 is a diagram illustrating an example of a related vehicle log list according to the present embodiment. Anomaly detection device 400 obtains and stores, in advance, the related vehicle log list illustrated in FIG. 9, for example.

In FIG. 9, the related vehicle log list is constituted by the vehicle state, a related communication ID, a related process ID, a vehicle state at the time of anomaly detection, and the save priority level. The vehicle state is an item indicating the vehicle state to be extracted from the vehicle log, and the related communication ID and the related process ID are a communication ID and a process ID that are highly related to the stated item, and are set in advance for each vehicle state item. The vehicle state at the time of anomaly detection indicates the vehicle state when anomaly detection device 400 detects the anomaly log, and the save priority level is a priority level indicating whether the vehicle log of the related communication ID and the related process ID is to be kept preferentially or not, where "high" is written when the save priority level is high and "low" is written when the save priority level is low.

For example, the related vehicle log list for which the vehicle state is "travel mode" has related communication IDs of "M2, M4" and related process IDs of "P3, P4, P7". If the vehicle state at the time of anomaly detection is "autonomous driving", the save priority level is "high", whereas if the vehicle state at the time of anomaly detection is "manual driving", the save priority level is "low". A save priority level of "high" indicates that the log has high importance with respect to the vehicle state at the time of anomaly detection (that the log has high importance with respect to analyzing the cause of the anomaly), and a save priority level of "low" indicates that the log has low importance with respect to the vehicle state at the time of anomaly detection (that the log has low importance with respect to analyzing the cause of the anomaly). Referring to the related vehicle log list makes it possible to ascertain the logs of highly-important communication messages and processes with respect to the vehicle state when the anomaly was detected, and these logs are likely to be useful in analyzing the cause of the anomaly.

Vehicle log save priority level change instructor 450 sets a post-change save priority level based on the related vehicle log list illustrated in FIG. 9. Vehicle log save priority level change instructor 450 sets the post-change save priority level based on, for example, the communication ID included in the in-vehicle message in the in-vehicle network of vehicle 10a, the process ID of the operating system or application executed on ECU group 500a, and the vehicle state (e.g., the vehicle state at the time of anomaly detection). Vehicle log save priority level change instructor 450 sets the post-change save priority level for each vehicle state item based on, for example, the degree (save priority level) that indicates whether the log information corresponding to the communication ID related to the vehicle state and the log information corresponding to the process ID related to the vehicle status are to be left preferentially.

Example of Vehicle Log Save Priority Level Settings

FIG. 10 is a diagram illustrating an example of vehicle log save priority level settings according to the present embodiment.

In FIG. 10, the vehicle log save priority level settings is constituted including a log ID, the save priority level, and a priority level setting time. The log ID indicates the communication ID or process ID included in the vehicle log. The save priority level indicates the priority level for saving the vehicle log, and one of "high", "medium", or "low" is listed in order of priority, e.g., "medium" is listed in the initial state. A vehicle log (log information) for a log ID having a low save priority level is preferentially deleted when deleting vehicle logs from ECU group 500a. The priority level setting time is the time when the save priority level was changed for the log ID, and is "-" if the save priority level has not been changed.

For example, in the vehicle log save priority level settings for the log ID of "M1", the save priority level is "low" and the priority level setting time is "T40". In other words, it can be seen that the save priority level of the vehicle log having the log ID of "M1" was changed to "low" at time T40. Additionally, for example, in the vehicle log save priority level settings for the log ID of "M3", the save priority level is "medium" and the priority level setting time is "-". In other words, the save priority level of the vehicle log having the log ID of M3 has not been changed from the initial state. Additionally, for example, in the vehicle log save priority level settings for the log ID of "P7", the save priority level is "high" and the priority level setting time is "T41". In other words, it can be seen that the save priority level of the vehicle log having the log ID of "P7" was changed to "high" at time T41.

Referring to the vehicle log save priority level settings makes it possible to preferentially save (store without deleting) logs which are necessary for analyzing the cause of an anomaly.

Processing Sequence

Figure 11:
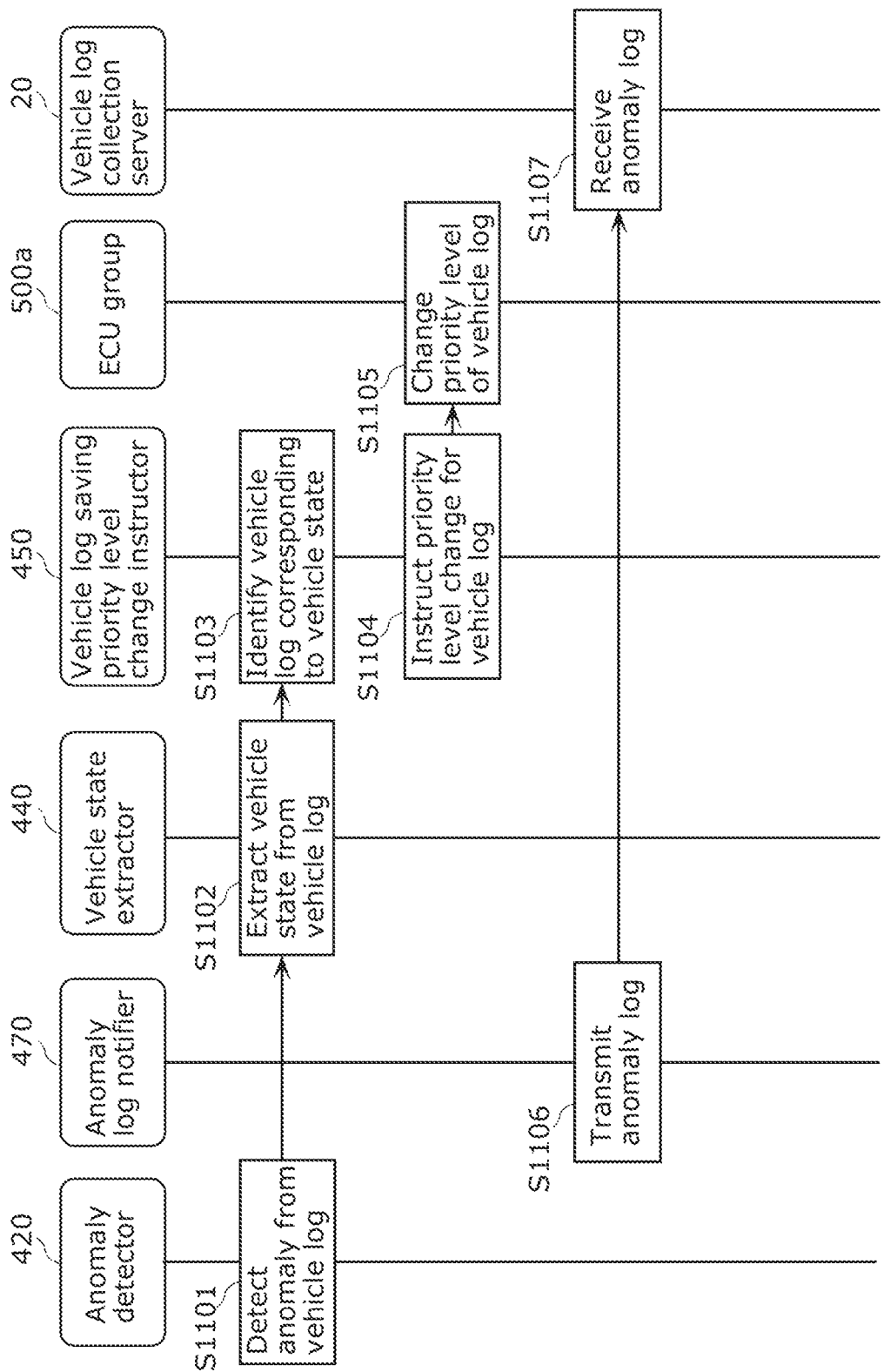
FIG. 11 is a diagram illustrating a sequence of anomaly log notification processing according to an embodiment.

FIG. 11 is a diagram illustrating a sequence of anomaly log notification processing (part of a vehicle log transmission method) according to the present embodiment. FIG. 11 illustrates a processing sequence from when vehicle log transmission device 10 detects an anomaly from a vehicle log to when an anomaly log is transmitted to vehicle log collection server 20.

(S1101) Anomaly detector 420 of anomaly detection device 400 obtains the vehicle logs of ECU group 500a over the internal network and detects an anomaly. In other words, anomaly detector 420 determines whether or not there is an anomaly based on the at least one instance of log information included in the obtained vehicle logs. Then, if an anomaly is detected, anomaly detector 420 extracts the log information in which the anomaly was detected as an anomaly log, stores the extracted anomaly log in anomaly log storage 430, and transmits an anomaly detection time and the vehicle log (the log information) to vehicle state extractor 440. An example of the method for detecting an anomaly is indicated in the example of the vehicle log in the in-vehicle network (FIG. 6) and the example of the vehicle log in the ECU (FIG. 7). Additionally, anomaly detector 420 may, for example, store the anomaly log indicated in FIG. 8 in anomaly log storage 430 and transmit the anomaly log to vehicle state extractor 440. Step S1101 is an example of a step of detecting an anomaly and a step of transmitting the anomaly log.

(S1102) Vehicle state extractor 440 receives the vehicle log from step S1101 and extracts the vehicle state at the anomaly detection time. vehicle state extractor 440 extracts the vehicle state at the anomaly detection time from, for example, a vehicle log (log information) aside from the vehicle log (log information) in which the anomaly was detected in step S1101. Then, vehicle state extractor 440 transmits the vehicle state to vehicle log save priority level change instructor 450. An example of the method for extracting the vehicle state is indicated in the example of the vehicle log in the in-vehicle network (FIG. 6).

(S1103) Vehicle log save priority level change instructor 450 refers to the related vehicle log list held by related vehicle log list storage 460 and identifies a vehicle log (log information) for which it is necessary to change the save priority level.

(S1104) Vehicle log save priority level change instructor 450 transmits a change instruction to change the save priority level of the vehicle log identified in step S1103 to ECU group 500a. Vehicle log save priority level change instructor 450 transmits a change instruction indicating a change to a common save priority level for each of the plurality of Zone ECUs 500a to 500d included in ECU group 500a, for example. In other words, the save priority level of the vehicle log changed in response to the change instruction is the same for each of the plurality of Zone ECUs 500a to 500d. Note that vehicle log save priority level change instructor 450 may transmit a change instruction indicating a change to mutually different save priority levels for each of the plurality of Zone ECUs 500a to 500d included in ECU group 500a, for example. Step S1104 is an example of a step of transmitting a change instruction.

Note that in step S1104, vehicle log save priority level change instructor 450 may transmit the change instruction to change the save priority level to ECU group 500a if a first time has passed after the anomaly detection time. In other words, vehicle log save priority level change instructor 450 may transmit the change instruction to change the save priority level to ECU group 500a even if no other anomalies have been detected between the previous detection of an anomaly and the present.

(S1105) ECU group 500a changes the priority level setting of the vehicle log. A method for changing the priority level setting of the vehicle log will be described later.

(S1106) Anomaly log notifier 470 receives the anomaly log from anomaly detector 420 and transmits the anomaly log to vehicle log collection server 20. Anomaly log notifier 470 may further generate an anomaly log identifier corresponding one-to-one with the anomaly log, and transmit the anomaly detection time and the anomaly log identifier to vehicle log collection server 20.

(S1107) Vehicle log collection server 20 receives the anomaly log and stores the anomaly log in anomaly log storage 230.

Vehicle Log Request Processing Sequence

Figure 12:
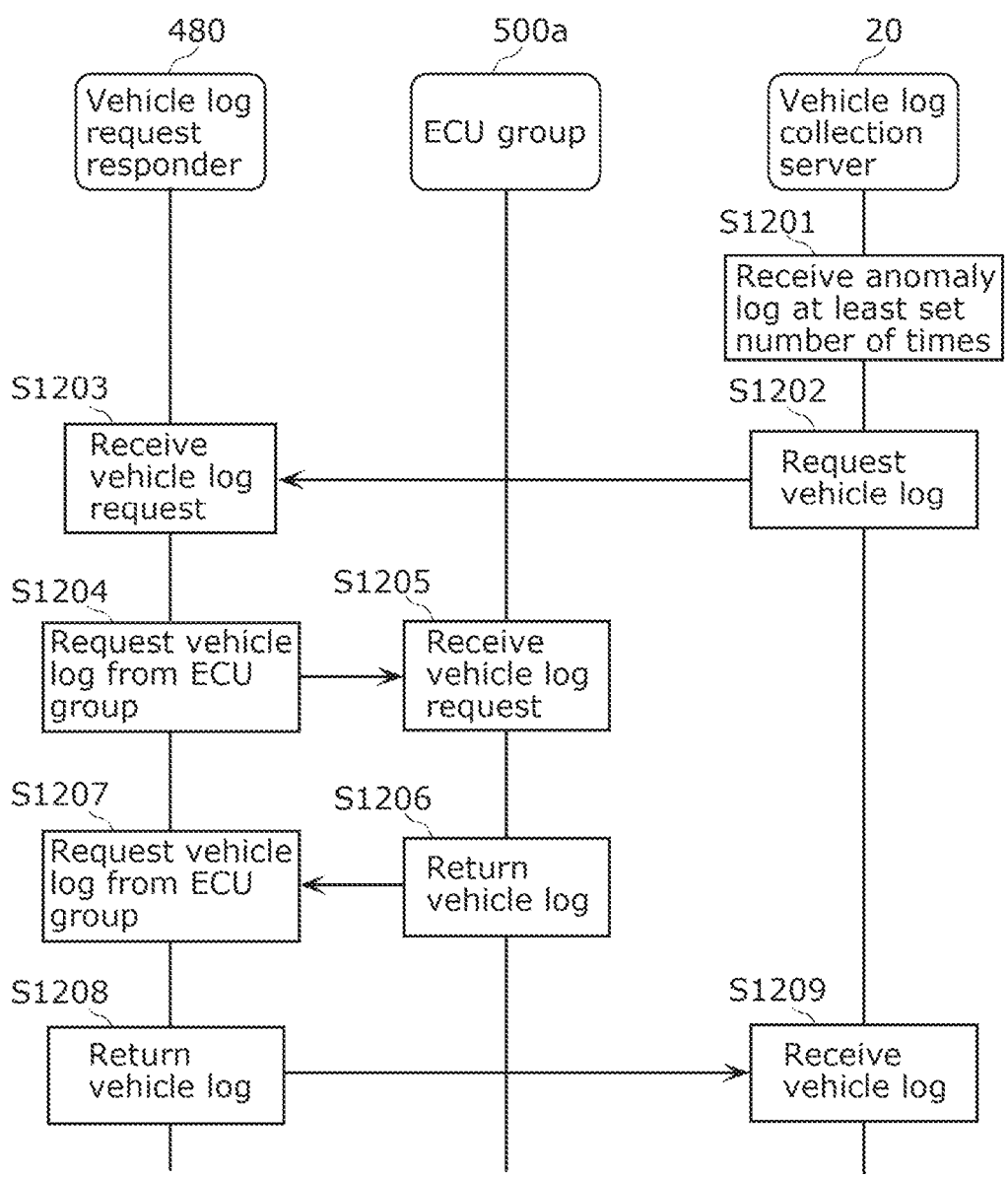
FIG. 12 is a diagram illustrating a sequence of vehicle log request response processing according to an embodiment.

FIG. 12 is a diagram illustrating a sequence of vehicle log request response processing (part of the vehicle log transmission method) according to the present embodiment. FIG. 12 illustrates a processing sequence from when vehicle log collection server 20 receives the anomaly log to when a request for a vehicle log is made to vehicle log transmission device 10 (anomaly detection device 400, in the present embodiment) and a response (a vehicle log from anomaly detection device 400) is received.

(S1201) Vehicle log collection server 20 determines whether an anomaly log has been received at least a set number of times. Vehicle log collection server 20 receives the anomaly log from step S1107 and stores the anomaly log in anomaly log storage 230. Vehicle log collection server 20 may determine whether the same anomaly log as a stored anomaly log has been received at least a set number of times. Here, if the vehicle log is determined to be necessary, vehicle log necessity determiner 240 requests vehicle log request responder 480 of vehicle log collection server 20 to transmit the vehicle log. The method of determining the necessity of the vehicle log will be described in detail later.

(S1202) If the anomaly log has been received at least the set number of times, vehicle log necessity determiner 240 requests vehicle log request responder 480 to transmit the vehicle log. In other words, vehicle log necessity determiner 240 transmits a vehicle log request. Vehicle log necessity determiner 240 may transmit a vehicle log request including the anomaly log identifier to vehicle log request responder 480, for example.

(S1203) Vehicle log request responder 480 receives the vehicle log request from step S1202. Vehicle log request responder 480 receives the vehicle log request including an anomaly log identifier from vehicle log collection server 20, for example.

(S1204) Vehicle log request responder 480 refers to anomaly log storage 430, and makes a request, to vehicle log request responder 550 of ECU group 500a, for vehicle logs from one hour before and after the anomaly detection time corresponding to the anomaly log identifier. Here, the one hour before and after is a value set in advance, and need not be one hour.

(S1205) Vehicle log request responder 550 of ECU group 500a receives the vehicle log request from step S1204.

(S1206) Vehicle log request responder 550 of ECU group 500a returns (transmits) the vehicle logs from one hour before and after the anomaly detection time to vehicle log request responder 480. Note that after vehicle log request responder 550 transmits the vehicle log to vehicle log request responder 480 in step S1206, vehicle log deleter 540 may delete the transmitted vehicle log.

(S1207) Vehicle log request responder 480 receives the vehicle log of step S1206 from ECU group 500a.

(S1208) Vehicle log request responder 480 returns (transmits) the vehicle log to vehicle log collection server 20. It can also be said that vehicle log request responder 480 collects the log information from a set period before and after the anomaly detection time corresponding to the anomaly log identifier from ECU group 500a, and transmits the vehicle logs containing the collected log information to vehicle log collection server 20. Step S1208 is an example of a step of obtaining and transmitting a vehicle log.

(S1209) Vehicle log collection server 20 receives the vehicle log from step S1208.

Through this, vehicle log collection server 20 can obtain, from anomaly detection device 400, a vehicle log necessary for monitoring or analyzing the anomaly.

Vehicle Log Save Priority Level Change Processing Flowchart

Figure 13:
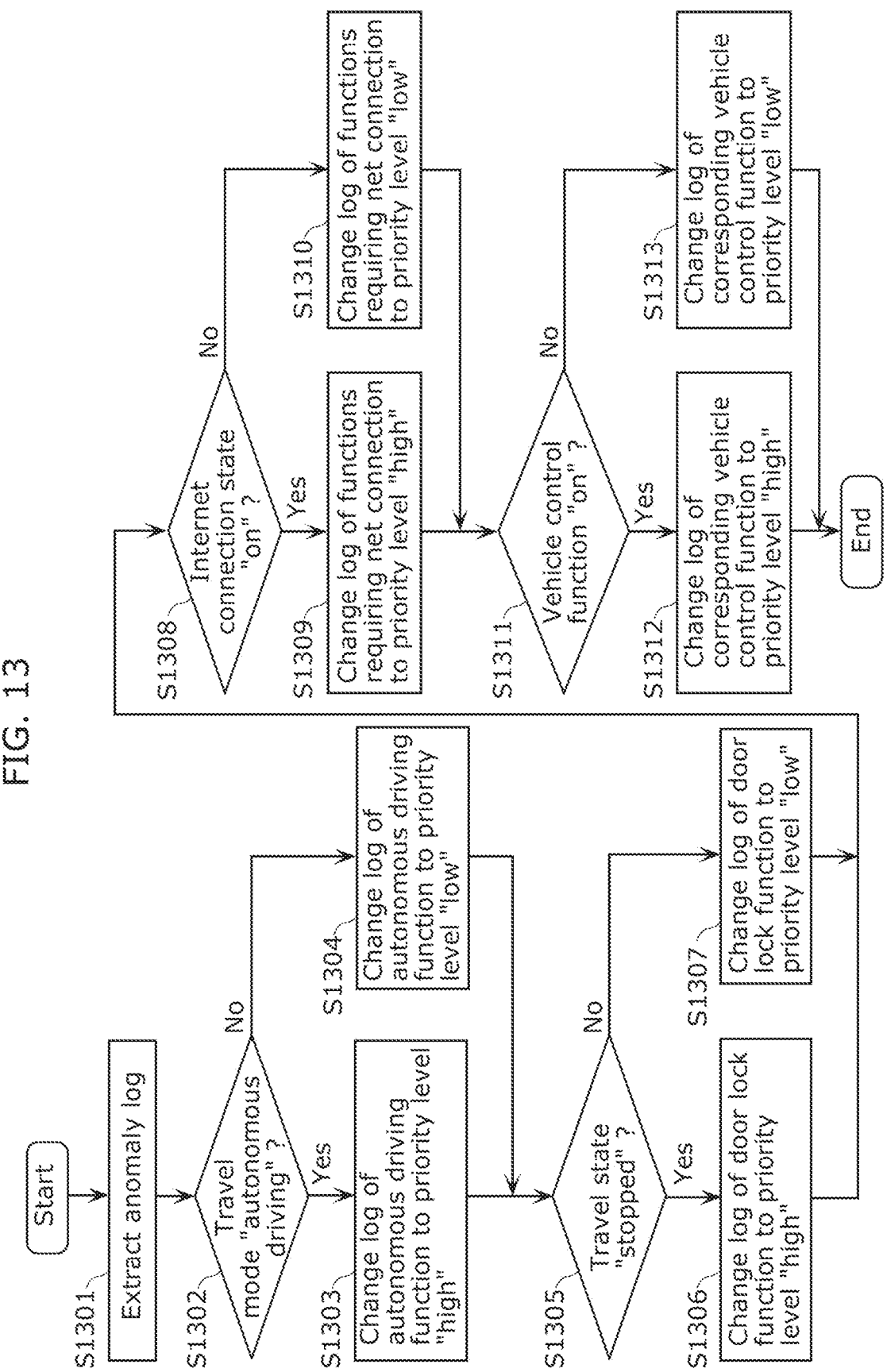
FIG. 13 is a flowchart illustrating vehicle log save priority level change processing according to an embodiment.

FIG. 13 is a flowchart illustrating vehicle log save priority level change processing (part of the vehicle log transmission method) according to the present embodiment. FIG. 13 is a flowchart illustrating vehicle log save priority level change processing by vehicle log save priority level change instructor 450.

(S1301) Anomaly detector 420 extracts the anomaly log from the vehicle log. Vehicle state extractor 440 then refers to the anomaly detection time included in the anomaly log and extracts the vehicle state at the anomaly detection time. Step S1302 is then executed.

(S1302) Vehicle log save priority level change instructor 450 determines whether the travel mode is autonomous driving in the vehicle state. Vehicle log save priority level change instructor 450 executes step S1303 if the travel mode is autonomous driving (Yes in S1302), and executes step S1304 if the travel mode is manual driving (No in S1302).

(S1303) Vehicle log save priority level change instructor 450 changes the save priority level of the log, among the vehicle log, for the autonomous driving function to "high", and then executes step S1305. Vehicle log save priority level change instructor 450 may, for example, change the save priority levels of the logs for the autonomous driving function to "high" uniformly regardless of the save priority level immediately before the processing of step S1303.

(S1304) Vehicle log save priority level change instructor 450 changes the save priority level of the log, among the vehicle log, for the autonomous driving function to "low", and then executes step S1305. Vehicle log save priority level change instructor 450 may, for example, change the save priority level of the log for the autonomous driving function to "low" uniformly regardless of the save priority level immediately before the processing of step S1304.

Thus it can also be said that in steps S1302 to S1304, vehicle log save priority level change instructor 450 changes the save priority level for a function related to autonomous driving to a second priority level higher than a first priority level when the travel mode is the autonomous driving mode, and changes the save priority level for the function related to autonomous driving to a third priority level lower than the first priority level when the travel mode is the manual driving mode.

(S1305) Vehicle log save priority level change instructor 450 determines whether the travel status is "stopped" in the vehicle state. Vehicle log save priority level change instructor 450 executes step S1306 if the travel status is "stopped" (Yes in S1305), and executes step S1307 if the travel status is "traveling" (No in S1305).

(S1306) Vehicle log save priority level change instructor 450 changes the save priority level of a door lock function, among the vehicle log, to "high", and then executes step S1308. Vehicle log save priority level change instructor 450 may, for example, change the save priority level of the door lock function to "high" uniformly regardless of the save priority level immediately before the processing of step S1306.

(S1307) Vehicle log save priority level change instructor 450 changes the save priority level of a door lock function, among the vehicle log, to "low", and then executes step S1308. Vehicle log save priority level change instructor 450 may, for example, change the save priority level of the door lock function to "low" uniformly regardless of the save priority level immediately before the processing of step S1307.

In this manner, in steps S1305 to S1307, vehicle log save priority level change instructor 450 may change the save priority level for a function related to the vehicle body control function including the door lock function to a fifth priority level lower than a fourth priority level when vehicle 10a is traveling, and may change the save priority level for the function related to the vehicle body control function to a sixth priority level higher than the fourth priority level when vehicle 10a is stopped.

(S1308) Vehicle log save priority level change instructor 450 determines whether the Internet connection status is "on" in the vehicle state. Vehicle log save priority level change instructor 450 executes step S1309 if the Internet connection status is "on" (Yes in S1308), and executes step S1309 if the Internet connection status is "off" (No in S1308).

(S1309) Vehicle log save priority level change instructor 450 changes the save priority level of a log, among the vehicle logs, of a function which requires an Internet connection to "high", and then executes step S1311. Vehicle log save priority level change instructor 450 changes the save priority level of the log of the function which requires an Internet connection to "high" uniformly regardless of the save priority level immediately before the processing of step S1309, for example.

(S1310) Vehicle log save priority level change instructor 450 changes the save priority level of a log, among the vehicle log, of the function which requires an Internet connection to "low", and then executes step S1311. Vehicle log save priority level change instructor 450 changes the save priority level of the log of the function which requires an Internet connection to "low" uniformly regardless of the save priority level immediately before the processing of step S1310, for example.

In this manner, in steps S1308 to S1310, vehicle log save priority level change instructor 450 may change the save priority level for a function that uses an Internet connection to an eighth priority level higher than a seventh priority level when connected to the Internet, and may change the save priority level for the function that uses an Internet connection to an eighth priority level lower than the seventh priority level when not connected to the Internet.

(S1311) Vehicle log save priority level change instructor 450 determines whether a vehicle control function is "on" in the vehicle state. Vehicle log save priority level change instructor 450 executes step S1312 if the vehicle control function is "on" (Yes in S1311), and executes step S1313 if the vehicle control function is "off" (No in S1311). Here, for example, "autonomous parking" and "CC" are indicated as vehicle control functions in the example of the vehicle log in the in-vehicle network (see FIG. 6), but vehicle log save priority level change instructor 450 may change the save priority level of a log related to the vehicle control function (autonomous parking) to "high" when the vehicle control function (autonomous parking) is "on" and change the save priority level of a log related to the vehicle control function (CC) to "high" when the vehicle control function (CC) is "on".

(S1312) Vehicle log save priority level change instructor 450 changes the save priority level of the log, among the vehicle logs, of the corresponding vehicle control function to "high", and then ends the processing. Vehicle log save priority level change instructor 450 changes, for example, the save priority level of the vehicle control function to "high" uniformly regardless of the save priority level immediately before the processing of step S1312.

(S1313) Vehicle log save priority level change instructor 450 changes the save priority level of the log, among the vehicle logs, of the corresponding vehicle control function to "low", and then ends the processing. Vehicle log save priority level change instructor 450 changes, for example, the save priority level of the vehicle control function to "low" uniformly regardless of the save priority level immediately before the processing of step S1313.

In this manner, in steps S1311 to S1313, vehicle log save priority level change instructor 450 may change the save priority level for a first vehicle control function related to the autonomous parking function to a tenth priority level higher than a ninth priority level when the autonomous parking function is "on", and may change the save priority level for the first vehicle control function related to the autonomous parking function to an eleventh priority level lower than the ninth priority level when the autonomous parking function is "off". Additionally, in steps S1311 to S1313, vehicle log save priority level change instructor 450 may change the save priority level for a second vehicle control function related to the cruise control function to a thirteenth priority level higher than a twelfth priority level when the cruise control function is "on", and may change the save priority level for the second vehicle control function related to the cruise control function to a fourteenth priority level lower than the twelfth priority level when the cruise control function is "off".

The emergency brake may be included in the vehicle control function. For example, vehicle log save priority level change instructor 450 may change the save priority level of a log related to a vehicle control function (emergency braking) to "high" (S1312) if the vehicle control function (emergency braking) is "on" (Yes in S1311), and may change the save priority level of the log related to the vehicle control function (emergency braking) to "low" if the vehicle control function (emergency braking) is "off" (No in S1311).

In this manner, in steps S1311 to S1313, vehicle log save priority level change instructor 450 may change the save priority level for a third vehicle control function related to the emergency brake function to a sixteenth priority level higher than a fifteenth priority level when the emergency brake function is "on", and may change the save priority level for the third vehicle control function related to the emergency brake function to an eighteenth priority level lower than the fifteenth priority level when the emergency brake function is "off".

Note that it is sufficient for vehicle log save priority level change instructor 450 to perform the processing of at least one of steps S1302 to S1304, steps S1305 to S1307, steps S1308 to S1310, and steps S1311 to S1313 (that is, change the save priority level). In other words, it is sufficient for vehicle log save priority level change instructor 450 to instruct ECU group 500a to change the save priority level.

Note that in FIG. 13, it is possible that the save priority level of the log (log information) for which the save priority level was set to "high" in the first determination processing will be reset to "low" in the determination processing after the stated first determination processing. In such a case, vehicle log save priority level change instructor 450 may set the result of the determination having the higher save priority level as the save priority level of that log. In other words, in the stated case, vehicle log save priority level change instructor 450 may set the "high" set in the first determination processing to the save priority level of that log.

In this manner, according to anomaly detection device 400, by changing the save priority level of an important vehicle log in a vehicle state when anomaly detection device 400 detects an anomaly (e.g., changing the save priority level to "high"), the important vehicle log can be saved in vehicle 10a for a long period of time. As a result, anomaly detection device 400 can provide the important log to the external vehicle log collection server 20 without deleting the log, even without preparing resources in vehicle 10a which can save a large number of logs. Vehicle log collection server 20 can analyze the cause of the anomaly using the important log, which makes it possible to contribute to the safety of vehicle 10a.

Flowchart of Vehicle Log Deletion Processing

Figure 14:
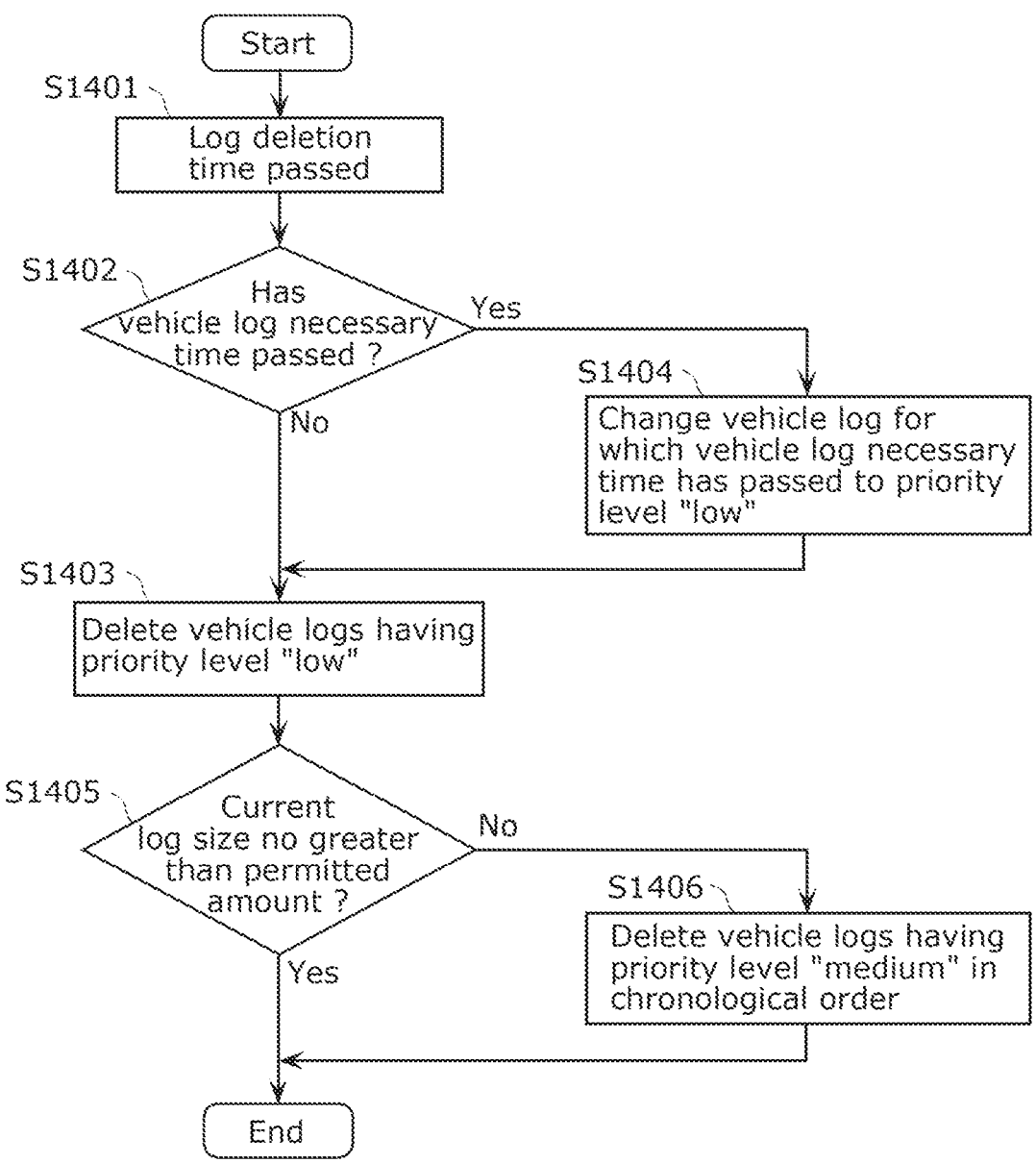
FIG. 14 is a flowchart illustrating a vehicle log request necessity determination according to an embodiment.

FIG. 14 is a flowchart illustrating vehicle log request necessity determination (part of the vehicle log transmission method) according to the present embodiment. FIG. 14 is a flowchart illustrating vehicle log deletion processing by vehicle log deleter 540 of ECU group 500a.

(S1401) Vehicle log deleter 540 stands by until a predetermined log deletion time elapses, and after the log deletion time elapses, executes step S1402. The log deletion time is, for example, 24 hours after the log information is obtained. The log deletion time may also be the amount of time elapsed after the most recent anomaly detection time, for example. By confirming the difference between the anomaly detection time and the current time, vehicle log deleter 540 can see that no vehicle log request has been made despite a long period of time passing after the occurrence of the anomaly, and can therefore determine that the priority level of a vehicle log related to that anomaly is not high. Then, by setting a low save priority level for the vehicle log related to that anomaly (S1404, described later), vehicle log deleter 540 can ensure that the vehicle log will be deleted preferentially, making it possible to keep more useful vehicle logs.

(S1402) Vehicle log deleter 540 determines whether a vehicle log unnecessary time has elapsed. Vehicle log deleter 540 refers to the vehicle log save priority level settings made by vehicle log priority level setter 520, executes step S1404 if there is a log ID for which the predetermined vehicle log unnecessary time has elapsed between the priority level setting time and the current time (Yes in S1402), and executes step S1403 if there is no such log ID (No in S1402). The vehicle log unnecessary time is a time longer than the log deletion time, and for example, the vehicle log unnecessary time is 72 hours. The vehicle log unnecessary time is an example of a second time.

(S1403) Vehicle log deleter 540 refers to the vehicle log save priority level settings, and of the vehicle logs stored in vehicle log storage 530, deletes a vehicle log (log information) corresponding to a log ID for which the save priority level is "low". Step S1405 is then executed.

(S1404) Vehicle log deleter 540 instructs vehicle log priority level setter 520 to change, to "low", the save priority level of a log ID for which the predetermined vehicle log unnecessary time has elapsed between the priority level setting time and the current time. Step S1403 is then executed.

Note that vehicle log deleter 540 may execute the processing of step S1403 even when the size of the vehicle logs stored in vehicle log storage 530 is at least a set value. In other words, vehicle log deleter 540 may delete log information for which the save priority level is low when the second time passes or when the size of the vehicle logs stored is at least a set value.

(S1405) Vehicle log deleter 540 determines whether the current log size is no greater than a permissible size. Vehicle log deleter 540 ends the processing if the data size of the current log is not greater than a predetermined permissible size (Yes in S1405), and executes step S1406 if the data size is greater than the permissible size (No in S1405).

(S1406) Vehicle log deleter 540 refers to the vehicle log save priority level settings, and of the vehicle logs stored in vehicle log storage 530, deletes a vehicle log corresponding to a log ID having a save priority level of "medium", in order from the oldest vehicle log, and then ends the processing.

In this manner, when the size of the vehicle log after deleting the log information having a save priority level of "low" is at least a set value, vehicle log deleter 540 may further delete log information having a save priority level higher than "low" (e.g., log information having a save priority level of "high").

As described above, vehicle log deleter 540 deletes a vehicle log (log information) based on the post-change save priority level, in accordance with the change instruction from vehicle log save priority level change instructor 450. Through this, anomaly detection device 400 can store a log necessary when analyzing the cause of the anomaly in vehicle log collection server 20 can be stored, even if the size of the data in the vehicle log to be stored exceeds an upper limit, by switching the log to be saved preferentially in accordance with the vehicle state at the time of an anomaly detection, without preparing abundant resources for saving logs in vehicle 10a.

Flowchart of Vehicle Log Deletion Processing

Figure 15:
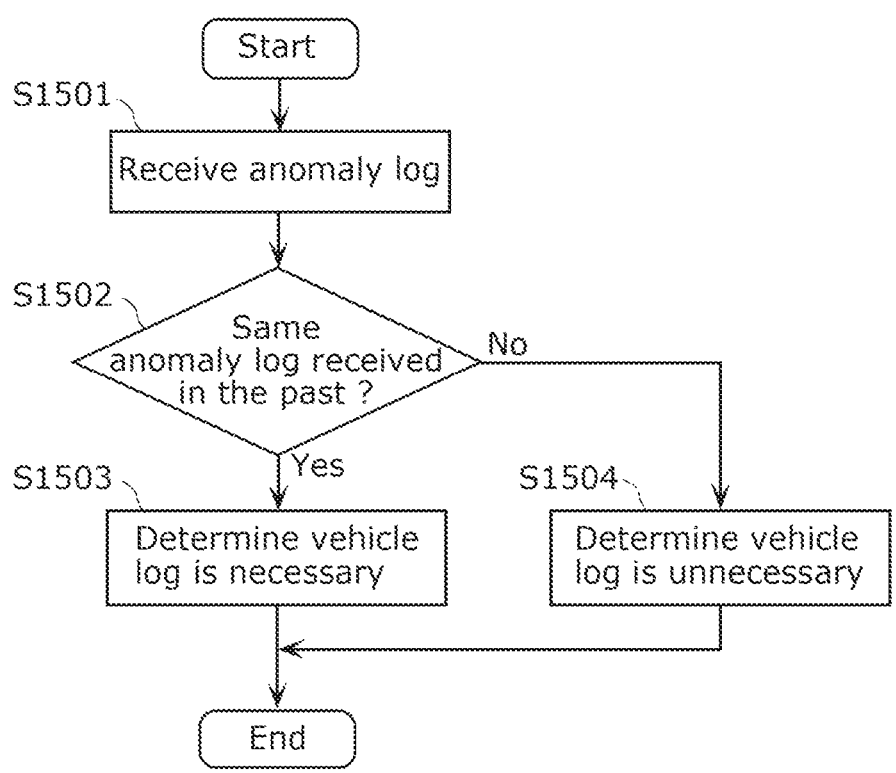
FIG. 15 is a flowchart illustrating vehicle log deletion processing according to an embodiment.

FIG. 15 is a flowchart illustrating vehicle log deletion processing according to the present embodiment. FIG. 15 is a flowchart illustrating vehicle log necessity determination processing by vehicle log necessity determiner 240.

(S1501) Anomaly log receiver 220 receives an anomaly log from vehicle log collection server 20, and executes step S1502.

(S1502) Vehicle log necessity determiner 240 determines whether the same anomaly log has been received in the past. If the same anomaly log is already stored in anomaly log storage 230 (Yes in S1502), step S1503 is executed, whereas if the same anomaly log is not stored (No in S1502), step S1504 is executed. Here, the vehicle log is determined to be necessary when the same anomaly log has been received even just one time, but the vehicle log may be determined to be necessary when the same anomaly log has been received a predetermined set number of times, or the vehicle log may be determined to be necessary based on the number of time the anomaly has occurred in a predetermined set period.

(S1503) Vehicle log necessity determiner 240 determines that the vehicle log is necessary, and ends the processing.

(S1504) Vehicle log necessity determiner 240 determines that the vehicle log is not necessary, and ends the processing.

Other Embodiments

As described thus far, an embodiment has been given as an example of the technique according to the present disclosure.

However, the technique in the present disclosure is not limited thereto, and can also be applied in embodiments in which modifications, replacements, additions, or omissions have been made as appropriate. For example, variations such as those described below are also included in the embodiments of the present disclosure.

(1) Although the foregoing embodiment is described as a security measure taken in an automobile, this technique is not limited to this application. The technique is not limited to automobiles, and can be applied in mobilities such as construction equipment, agricultural equipment, ships, rail cars, aircraft, and the like. The technique may also be applied in a communication network used in an industrial control system in a factory, a building, or the like; in a communication network for controlling an embedded device; or to a home network to which devices in a home are connected.

(2) Although the foregoing embodiment described anomaly detection device 400 as being connected to vehicle log collection server 20 over an external network, central ECU 300 may be connected to vehicle log collection server 20 and mediate the communication between anomaly detection device 400 and vehicle log collection server 20.

(3) Although the foregoing embodiment described the related vehicle log list held by anomaly detection device 400 as being stored in advance, this list may be changed in response to a request from vehicle log collection server 20.

(4) Although the foregoing embodiment described ECU group 500a as holding the times of the vehicle logs and vehicle log deleter 540 as lowering the save priority level in a set period or when the log size is a set size, anomaly detector 420 may hold the anomaly detection time and make an instruction for lowering the save priority level of a vehicle log for which a set period has passed after the anomaly detection time.

(5) Although the embodiment described vehicle log deleter 540 of ECU group 500a as lowering the save priority level in a set period or when the log size is a set size, a vehicle log transmitted to anomaly detection device 400 may be deleted after the transmission.

(6) Although the foregoing embodiment described the levels of the vehicle log save priority level as being "high", "medium", and "low", numerical values indicating the save priority levels may be used instead.

(7) Although the foregoing embodiment described several examples of vehicle states, conditions outside vehicle 10a, such as traffic information and weather information, may be used in addition to individual statuses of the vehicle, such as the driving status or travel status.

(8) Although the foregoing embodiment described vehicle log necessity determiner 240 of vehicle log collection server 20 as determining whether a vehicle log is necessary based on whether the same anomaly log has been received in the past, the configuration is not limited thereto. For example, vehicle log necessity determiner 240 may determine that the vehicle log is necessary when the same anomaly log has been received at least a set number of times, when the same anomaly log has been received from a set number of vehicles, when an anomaly log of a module essential for vehicle control has been received, and the like.

(9) Some or all of the constituent elements constituting the devices in the foregoing embodiment may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions of the devices by the microprocessor operating in accordance with the computer program. The units of the constituent elements constituting the foregoing devices may be implemented individually as single chips, or may be implemented with a single chip including some or all of the devices. Although the term "system LSI" is used here, other names, such as IC, LSI, super LSI, ultra LSI, and so on may be used, depending on the level of integration. Furthermore, the method for implementing the integrated circuit is not limited to LSI; the circuit may be implemented through a dedicated circuit, a generic processor, or the like. An FPGA (Field Programmable Gate Array) capable of post-production programming or a reconfigurable processor in which the connections and settings of the circuit cells within the LSI can be reconfigured may be used as well. Furthermore, should technology for implementing integrated circuits that can replace LSI appear due to advancements in semiconductor technology or the appearance of different technologies, the integration of the above function blocks may be performed using such technology. Biotechnology applications are one such foreseeable example.

(10) Some or all of the constituent elements constituting the foregoing devices may be constituted by IC cards or stand-alone modules that can be removed from and mounted in the apparatus. The IC card or module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(11) As one aspect of the present disclosure, the vehicle log transmission method may be a program (a computer program) that implements these methods on a computer, or a digital signal constituting the computer program. Additionally, one aspect of the present disclosure may be a computer program or a digital signal recorded in a computer-readable recording medium such as a flexible disk, hard disk, CD-ROM, MO, DVD, DVD-ROM, DVD-RAM, BD (Blu-ray (registered trademark) Disc), semiconductor memory, or the like. The constituent elements may also be the digital signals recorded in such a recording medium. Additionally, one aspect of the present disclosure may be realized by transmitting the computer program or digital signal via a telecommunication line, a wireless or wired communication line, a network such as the Internet, a data broadcast, or the like. Additionally, one aspect of the present disclosure may be a computer system including a microprocessor and memory, where the memory records the above-described computer program and the microprocessor operates in accordance with the computer program. Additionally, the present disclosure may be implemented by another independent computer system, by recording the program or the digital signal in the recording medium and transferring the recording medium, or by transferring the program or the digital signal over the network or the like.

(12) Although the foregoing embodiment described an example in which vehicle log transmission device 10 is installed in vehicle 10a, the configuration is not limited thereto. Vehicle log transmission device 10 is not limited to being installed in vehicle 10a, as long as vehicle log transmission device 10 is communicably connected to both the in-vehicle network and vehicle log collection server 20.

(13) Anomaly detection device 400 (vehicle log transmission device 10) in the foregoing embodiment may be realized by a plurality of devices. In this case, the constituent elements of anomaly detection device 400 may be divided among the plurality of devices in any manner. The method for communication among the plurality of devices is not particularly limited either.

(14) Although FIG. 9 described in the foregoing embodiment illustrates an example in which a related communication ID and a related process ID are set for each vehicle state item, it is sufficient for at least one of the related communication ID or the related process ID to be set.

(15) Although FIG. 9 described in the foregoing embodiment illustrates the post-change save priority level as the save priority level, the configuration is not limited thereto. The save priority level illustrated in FIG. 9 may be information indicating a degree of change from the current save priority level. The save priority level in FIG. 9 may be associated with information indicating, for example, raising the save priority level by one level from the current level when the vehicle state at the time of anomaly detection is autonomous driving, and lowering the save priority level by one level from the current save priority level when the vehicle state at the time of anomaly detection is manual driving.

(16) Although the foregoing embodiment described security measures for a cyber-physical system targeting automobiles, at least one of the determination results and output results of each process of the security function may be displayed as a user interface (UI) for visualizing attacks in the cyber-physical system.

(17) Aspects realized by combining the constituent elements and functions described in the foregoing embodiment and variations as desired are also included in the scope of the present disclosure.

INDUSTRIAL APPLICABILITY

The vehicle log transmission device and the like according to an aspect of the present disclosure are useful in mobility devices, such as vehicles, which save log information.

The invention claimed is:

1. A vehicle log transmission device that transmits a vehicle log to a vehicle log collection server, the vehicle log being saved in at least one electronic control unit installed in a vehicle and including at least one instance of log information related to the vehicle, the vehicle log transmission device comprising:
 a processor; and
 a memory including a program that, when executed by the processor, causes the processor to perform operations, the operations including:
  obtains obtaining the vehicle log from the at least one electronic control unit, detecting an anomaly based on the at least one instance of log information included in the vehicle log obtained, and extracting log information in which the anomaly is detected as an anomaly log;
  transmitting the anomaly log to the vehicle log collection server;
  transmitting, based on a vehicle state extracted from the vehicle log and to the at least one electronic control unit, a change instruction to change a save priority level of the at least one instance of log information included in the vehicle log, the save priority level indicating a priority level for keeping the at least one instance of log information; and
  obtaining, when a vehicle log request requesting the vehicle log to be transmitted from the vehicle log collection server is received, the vehicle log including log information saved based on the save priority level changed in response to the change instruction from the at least one electronic control unit, and transmitting the vehicle log obtained to the vehicle log collection server,
 wherein the change instruction includes instructing the at least one electronic control unit to increase or decrease the save priority level for a function of the vehicle.

2. The vehicle log transmission device according to claim 1,
 wherein the operations further steres include storing an anomaly detection time indicating a time at which the anomaly is detected, and
 the processor transmits the change instruction to change the save priority level to the at least one electronic control unit based on the anomaly detection time.

3. The vehicle log transmission device according to claim 2,
 wherein the processor transmits the change instruction to change the save priority level to the at least one electronic control unit when a first time has elapsed after the anomaly detection time.

4. The vehicle log transmission device according to claim 2,
 wherein the processor sets the save priority level after the change based on a communication identifier (ID) included in an in-vehicle message in an in-vehicle network of the vehicle, a process [ID]] identifier (ID) of an operating system or an application executed by the at least one electronic control unit, and the vehicle state.

5. The vehicle log transmission device according to claim 4,
 wherein the vehicle state includes a plurality of states in the vehicle, and
 the processor sets the save priority level after the change for each of the plurality of states based on a degree indicating whether to preferentially keep log information corresponding to the communication ID related to the vehicle state and log information corresponding to the process ID related to the vehicle state.

6. The vehicle log transmission device according to claim 2,
 wherein the processor uses, as the vehicle state, a state including at least one of a travel mode indicating whether the vehicle is driving autonomously or being driven manually, a travel status indicating whether the vehicle is traveling or stopped, an Internet connection status indicating whether the vehicle is connected to the Internet or is not connected to the Internet, a first vehicle control function status indicating whether an autonomous parking function is on or off, a second vehicle control function status indicating whether a cruise control function is on or off, or a third vehicle control function status indicating whether an emergency brake is on or off.

7. The vehicle log transmission device according to claim 6,
 wherein the processor instructs the at least one electronic control unit to make at least one of the following changes:
  changing the save priority level for a function related to autonomous driving to a second priority level higher than a first priority level when the travel mode is an autonomous driving mode;
  changing the save priority level for the function related to autonomous driving to a third priority level lower than the first priority level when the travel mode is a manual driving mode;
  changing the save priority level for a function related to a vehicle body control function including a door lock function to a fifth priority level lower than a fourth priority level when the vehicle is traveling;
  changing the save priority level for the function related to the vehicle body control function to a sixth priority level higher than the fourth priority level when the vehicle is stopped;

changing the save priority level for a function that uses an Internet connection to an eighth priority level higher than a seventh priority level when the vehicle is connected to the Internet;

changing the save priority level for the function that uses the Internet connection to an eighth priority level lower than the seventh priority level when the vehicle is not connected to the Internet;

changing the save priority level for a first vehicle control function related to the autonomous parking function to a tenth priority level higher than a ninth priority level when the autonomous parking function is on;

changing the save priority level for the first vehicle control function related to the autonomous parking function to an eleventh priority level lower than the ninth priority level when the autonomous parking function is off;

changing the save priority level for a second vehicle control function related to the cruise control function to a thirteenth priority level higher than a twelfth priority level when the cruise control function is on;

changing the save priority level for the second vehicle control function related to the cruise control function to a fourteenth priority level lower than the twelfth priority level when the cruise control function is off;

changing the save priority level for a third vehicle control function related to an emergency brake function to a sixteenth priority level higher than a fifteenth priority level when the emergency brake function is on; and changing the save priority level for the third vehicle control function related to the emergency brake function to an eighteenth priority level lower than the fifteenth priority level when the emergency brake function is off.

8. The vehicle log transmission device according to claim 2, wherein the operations further include generating an anomaly log identifier corresponding one-to-one with the anomaly log, and transmitting the anomaly detection time and the anomaly log identifier to the vehicle log collection server, and the processor receives the anomaly log identifier from the vehicle log collection server, collects log information in a set period before and after the anomaly detection time corresponding to the anomaly log identifier from the at least one electronic control unit, and transmits the vehicle log including the log information collected to the vehicle log collection server.

9. A vehicle log collection system comprising:
the vehicle log transmission device according to claim 1;
the at least one electronic control unit installed in the vehicle; and
the vehicle log collection server,
wherein each of the at least one electronic control unit is configured to:
change the save priority level of the vehicle log in accordance with the change instruction to change the save priority level of the vehicle log received from the vehicle log transmission device;
delete, according to the save priority level of the vehicle log, deletes, and from the at least one instance of log information included in the vehicle log, log information based on the save priority level; and
transmit, in accordance with the vehicle log request received from the vehicle log transmission device, transmits the vehicle log stored in the electronic control unit to the vehicle log transmission device, and the vehicle log collection server includes is configured to:

receive the anomaly log from the vehicle log transmission device;

transmit the vehicle log request to the vehicle log transmission device; and receive the vehicle log based on the vehicle log request from the vehicle log transmission device.

10. The vehicle log collection system according to claim 9, wherein the at least one electronic control unit deletes log information for which the save priority level is low when a second time passes or when a size of the vehicle log stored is at least a set value.

11. The vehicle log collection system according to claim 10, wherein when the size of the vehicle log is at least the set value after the log information for which the save priority level is low is deleted, the at least one electronic control unit further deletes log information for which the save priority level is high, in order from oldest log information.

12. The vehicle log collection system according to claim 9, wherein after the at least one electronic control unit transmits the vehicle log to the vehicle log transmission device, the at least one electronic control unit deletes the vehicle log transmitted.

13. The vehicle log collection system according to claim 9, wherein the vehicle log collection server further determines whether the vehicle log request is necessary based on the anomaly log.

14. The vehicle log collection system according to claim 13, wherein the vehicle log collection server determines whether the vehicle log request is necessary based on a total number of times the anomaly log is received.

15. A vehicle log transmission method of transmitting a vehicle log to a vehicle log collection server, the vehicle log being saved in at least one electronic control unit installed in a vehicle and including at least one instance of log information related to the vehicle, the vehicle log transmission method comprising:

obtaining the vehicle log from the at least one electronic control unit, detecting an anomaly based on the at least one instance of log information included in the vehicle log obtained, and extracting log information in which the anomaly is detected as an anomaly log;

transmitting the anomaly log to the vehicle log collection server;

transmitting, to the at least one electronic control unit, based on a vehicle state extracted from the vehicle log, a change instruction to change a save priority level of the at least one instance of log information included in the vehicle log, the save priority level indicating a priority level for keeping the log information; and when a vehicle log request requesting the vehicle log to be transmitted from the vehicle log collection server is received, obtaining the vehicle log including log information saved based on the save priority level changed in response to the change instruction from the at least one electronic control unit, and transmitting the vehicle log obtained to the vehicle log collection server, wherein the change instruction includes instructing the at least one electronic control unit to increase or decrease the save priority level for a function of the vehicle.

16. A save priority level changing device, comprising:
a processor; and
a memory including a program that, when executed by the processor, causes the processor to perform operations, the operations including:
   obtaining a vehicle log including at least one instance of log information pertaining to a vehicle from at least one electronic control unit that saves the vehicle log and that is installed in the vehicle, detecting an anomaly based on the at least one instance of log information included in the vehicle log obtained, and extracting log information in which the anomaly is detected as an anomaly log;
   transmitting the anomaly log to a vehicle log collection server; and
   transmitting, based on a vehicle state extracted from the vehicle log and to the at least one electronic control unit, a change instruction to change a save priority level of the at least one instance of log information included in the vehicle log, the save priority level indicating a priority level for keeping the log information,
wherein the change instruction includes instructing the at least one electronic control unit to increase or decrease the save priority level for a function of the vehicle.

* * * * *